United States Patent
Pyati

(10) Patent No.: US 11,176,589 B2
(45) Date of Patent: Nov. 16, 2021

(54) DYNAMICALLY GENERATED MACHINE LEARNING MODELS AND VISUALIZATION THEREOF

(71) Applicant: eBay Inc., San Jose, CA (US)

(72) Inventor: Vikram Pyati, Campbell, CA (US)

(73) Assignee: eBay Inc., San Jose, CA (US)

(*) Notice: Subject to any disclaimer, the term of this patent is extended or adjusted under 35 U.S.C. 154(b) by 889 days.

(21) Appl. No.: 15/949,107

(22) Filed: Apr. 10, 2018

(65) Prior Publication Data

US 2019/0311301 A1    Oct. 10, 2019

(51) Int. Cl.
G06Q 30/06        (2012.01)
G06F 16/901       (2019.01)
G06N 20/00        (2019.01)
G06Q 30/02        (2012.01)

(52) U.S. Cl.
CPC ....... *G06Q 30/0631* (2013.01); *G06F 16/901* (2019.01); *G06N 20/00* (2019.01); *G06Q 30/0202* (2013.01)

(58) Field of Classification Search
CPC ............ G06Q 30/0631; G06Q 30/0202; G06F 16/901; G06N 20/00
USPC .......................................................... 706/12
See application file for complete search history.

(56) References Cited

U.S. PATENT DOCUMENTS

| | | |
|---|---|---|
| 7,689,463 B1 | 3/2010 | Mesaros |
| 7,899,707 B1 | 3/2011 | Mesaros |
| 8,494,914 B2 | 7/2013 | Mesaros |
| 9,070,166 B2 | 6/2015 | Bennett et al. |
| 9,727,826 B1 * | 8/2017 | Lindstrom .............. H04L 67/10 |
| 2014/0074595 A1 | 3/2014 | Chomsky et al. |

(Continued)

FOREIGN PATENT DOCUMENTS

| | | | |
|---|---|---|---|
| EP | 3079116 A1 | | 10/2016 |
| KR | 20170126300 A | * | 11/2017 |
| WO | 2019/199719 A1 | | 10/2019 |

OTHER PUBLICATIONS

Whitson Gordon, Search eBay for "Completed Listings" to Know How Much Your Stuff Is Worth, 2012 (Year: 2012).*

(Continued)

*Primary Examiner* — Tarek Elchanti
(74) *Attorney, Agent, or Firm* — Schwegman Lundberg & Woessner, P.A.

(57) ABSTRACT

Systems and methods provide real-time machine learning modeling, evaluation, and visualization. A computing system can receive input values for attributes of a new item listing. Concurrently, the system can analyze previous related item listings. The system can process the attributes and associated values of the new listing and previous listings to extract features and associated values. The system can apply the features of previous listings to machine learning algorithms to generate a machine learning model directed towards a target objective, such as maximizing a selling price or a selling probability for the new listing. The system can determine a likely outcome of the new listing by applying user-input values to the model and alternative outcomes by substituting one or more user-input values. If the alternative outcomes represent better results, then the system can present suggestions to revise the new listing to replace one or more user-input values with substitute values.

16 Claims, 17 Drawing Sheets

(56) References Cited

U.S. PATENT DOCUMENTS

2014/0279153 A1 9/2014 Friedman
2014/0289008 A1 9/2014 Leuer et al.
2016/0371589 A1* 12/2016 Golbandi ........... G06Q 30/0269

OTHER PUBLICATIONS

Jason Brownlee, How to Automatically Generate Textual Descriptions for Photographs with Deep Learning, 2017 (Year: 2017).*
International Preliminary Report on Patentability Received for Application No. PCT/US2019/026443, dated Oct. 22, 2020, 10 Pages.
International Search Report received for PCT Application No. PCT/US2019/026443, dated Jul. 17, 2019, 4 pages.
International Written Opinion received for PCT Application No. PCT/US2019/026443, dated Jul. 17, 2019, 8 pages.
McAuley et al., "Inferring Networks of Substitutable and Complementary Products", Knowledge Discovery and Data Mining, ACM, Aug. 10, 2015, pp. 785-794.
Mehta et al., "A Review On Matrix Factorization Techniques In Recommender Systems", 2017 2nd International Conference on Communication Systems, Computing and It Applications (CSCITA), IEEE, Apr. 7, 2017, pp. 269-274.

* cited by examiner

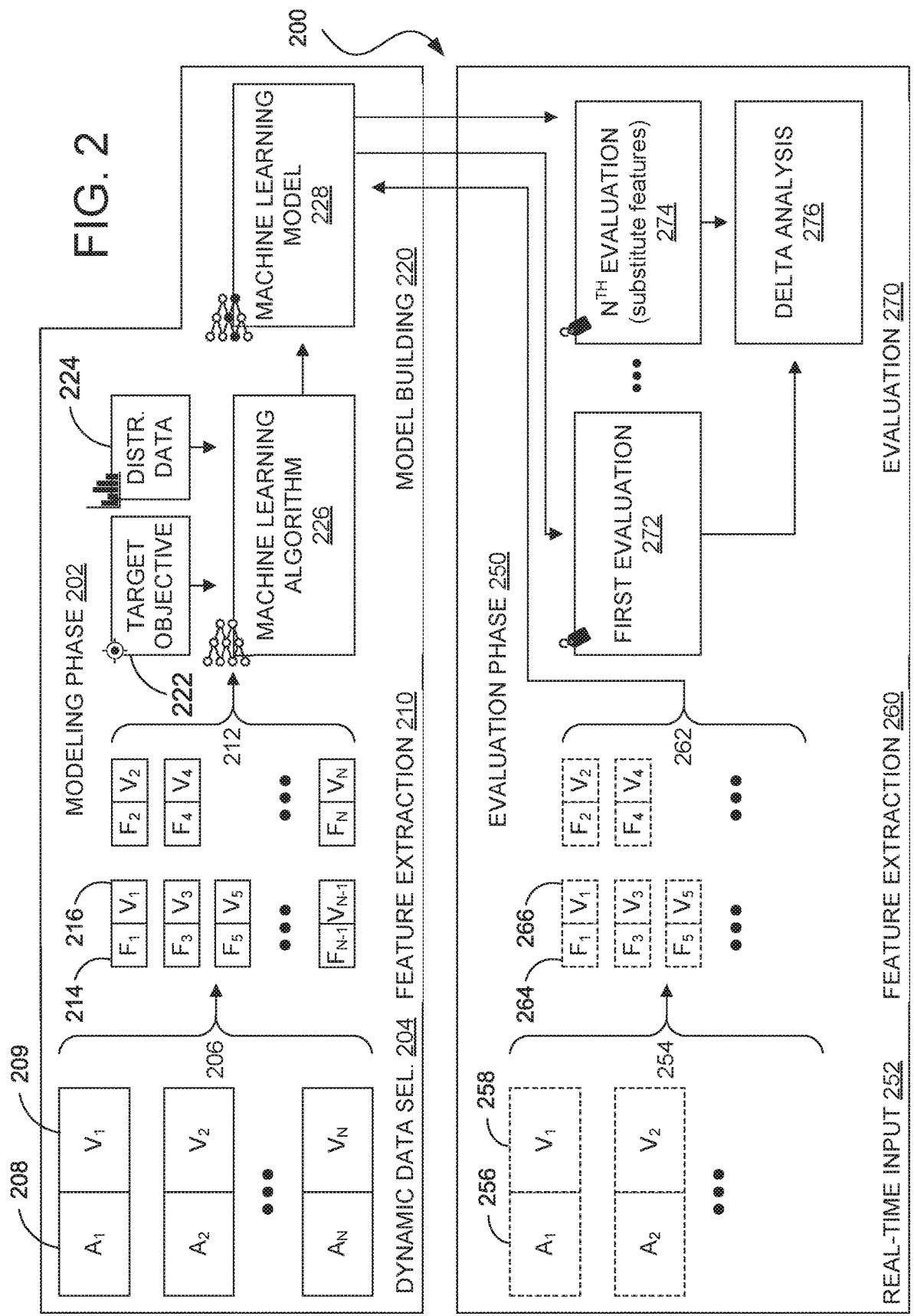

DYNAMICALLY GENERATED MACHINE LEARNING MODELS AND VISUALIZATION THEREOF

TECHNICAL FIELD

The subject matter of the present disclosure generally relates to the field of machine learning and visualization thereof, and more particularly to approaches for real-time machine learning modeling of item listings and generation of user interfaces for visualizing the output of multiple evaluations of the machine learning models.

BACKGROUND

The rate of data generation and collection is rapidly accelerating, driven by technological advances in computing infrastructure (e.g., processing, memory, storage, and networking resources) that provide for seemingly limitless capture and storage of data and the proliferation of new sources of data (e.g., mobile devices, digital cameras, social or content sharing networks, etc.) that supply streams of information that appear to have no end. Enterprises and other organizations attempt to make sense of their data by designing systems to mine their data and discover insights that may help achieve organizational goals. Customers or end users of these enterprises sometimes have the same or similar access to this data but may be unaware of their access to data or how to leverage access, lack knowledge in data science to take advantage of their access to the data, or have little to no motivation to analyze voluminous amounts of data.

BRIEF DESCRIPTION OF THE DRAWINGS

Various ones of the appended drawings merely illustrate example embodiments of the present disclosure and cannot be considered as limiting its scope.

FIG. 2 illustrates an example of a diagram for a data flow of a computing system capable of dynamically generating machine learning models and real-time interfaces for visualizing evaluations of the models in accordance with an embodiment;

DETAILED DESCRIPTION

Figure 1:
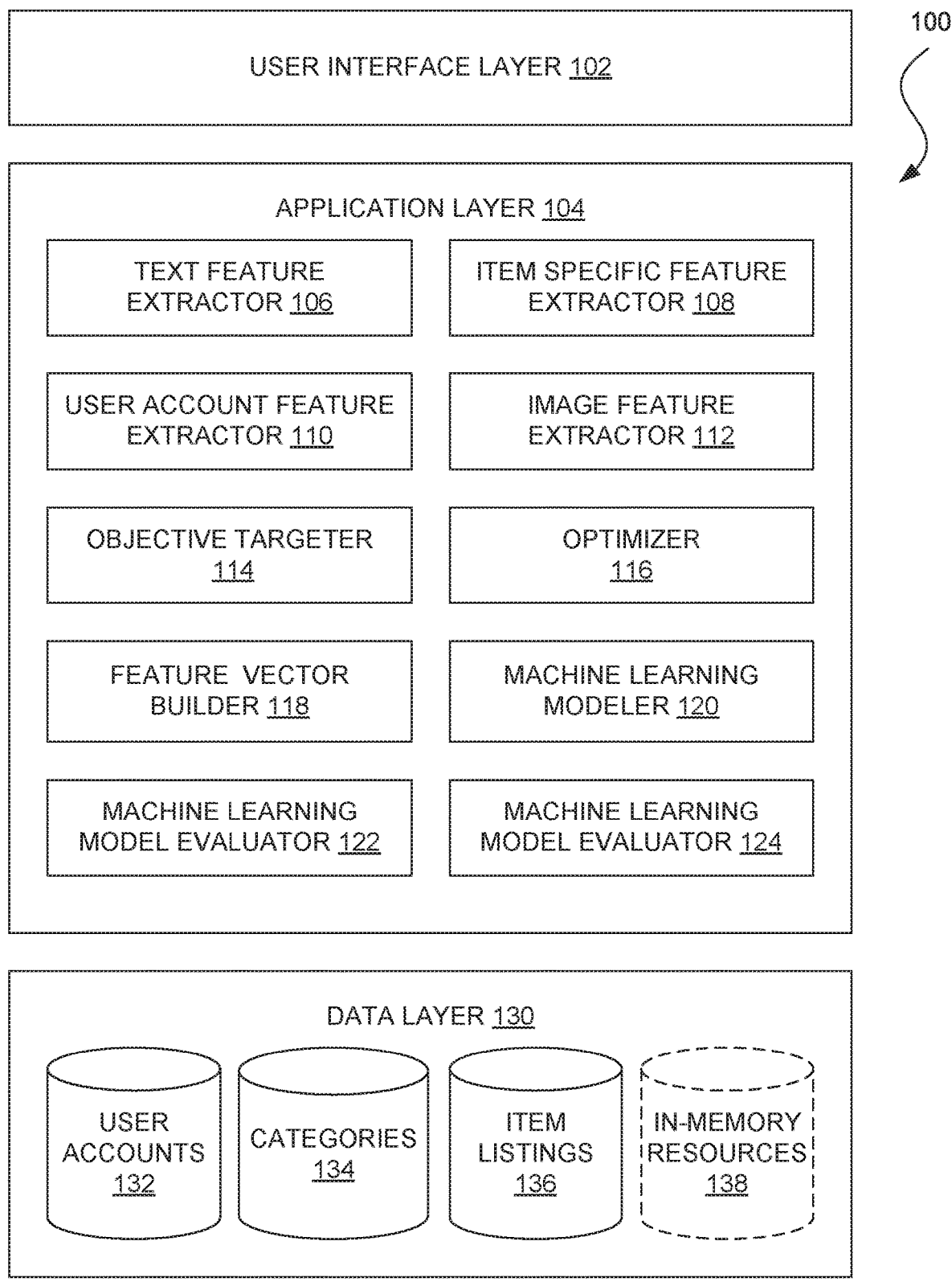
FIG. 1 illustrates an example of an application architecture for dynamically generating machine learning models and user interfaces for visualizing evaluations of the models in accordance with an embodiment.

Systems and methods in accordance with various embodiments may overcome these and other deficiencies in prior art approaches for analyzing complex, heterogenous data sets and presenting the data in an intuitive manner for users to understand. Various embodiments of the present disclosure can involve dynamic or real-time machine learning modeling, evaluation, and visualization (e.g., where dynamic or real-time can refer to operation with little to no noticeable delay by a user or operation exceeding a minimum threshold of latency). In some embodiments, a computing system of a network-based service or application can receive attribute values for attributes of a new item listing, such as a category, title, description, and photographs and videos of an item. Concurrently, the computing system can analyze previous item listings related to the new item listing, such as item listings in the same category as the new item listing, item listings of items purchased by a specific user or set of users sharing common traits, or item listings published within a specified time period. The computing system may process the attributes and associated attribute values of the new item listing and previous item listings to extract their features and associated feature values.

Individual attributes may lie in multiple data domains. For example, some features of a title of an item listing may be quantitative, such as the number of characters of the title or the number of words in the title. Other features of the title may be characterized as semantic, such as the similarities or the differences in the meaning of the title to the titles of other item listings, or syntactic, such as whether the words and phrases of the title adhere to a particular grammar. Still other features of a title may be image-based, such as the color or texture of the title, or if the title includes icons, emoji, ASCII art, or background imagery, the points and features of such image data. The system can subsequently determine a representation of each item listing (sometimes referred to as a feature vector).

In some embodiments, the computing system can apply the feature vectors of previous item listings to one or more machine learning algorithms to generate a machine learning model directed towards a target objective, such as maximizing a selling price or a selling probability for the new item listing. The system can construct the model before the user completes the new item listing in many cases. In such situations, the system can evaluate user input values for the new item listing relative to the target objective. Simultaneously, the system can substitute one or more user input values and apply the substitute values with the remaining user input values to the generated machine learning model to determine one or more alternative outcomes. If the alternative outcomes represent better results (e.g., findings that are closer to the target objective), then the system can present suggestions to revise the new item listing to replace one or more user-entered values with the substitute values. In some embodiments, the system may also present differences (e.g., increased selling price or selling probability) between the predicted outcome for the new item listing with user-input values and one or more alternative outcomes with one or more substitute values.

Turning now to the drawings, FIG. 1 shows an example of a system, application architecture 100, capable of dynamically generating machine learning models and interfaces for visualizing evaluations performed by the models. The system can be a content management system that includes functionality of an online marketplace (e.g., eBay® Inc.) to enable content providers (e.g., sellers) to create, edit, delete, upload, publish, or otherwise manage content (e.g., text, image, video, application, other media, or multimedia combinations thereof), such as item listings, for consumption by end users (e.g., buyers). However, a person having ordinary skill in the art will appreciate that application architecture 100 is also suitable for other network-based services or applications, such as search engines/web portals, social networks, forum/question-and-answer websites, news websites, online encyclopedias, media streaming networks (e.g., music, videos, multimedia, etc.), content aggregators, product review sites, corporate sites, personal sites, file-sharing sites, among others. In addition, for any system or system element discussed in the present disclosure, there can be additional, fewer, or alternative components arranged in similar or alternative configurations, within the scope of the various embodiments unless otherwise stated. For instance, although FIG. 1 illustrates a multi-tier application architecture, other embodiments may utilize other application architectures, such as a client-server architecture, an event-driven architecture, a service-oriented architecture (SOA), or a microservices architecture, among many other possibilities.

In this example, application architecture 100 includes presentation layer 102, application layer 104, and data layer 130. Each module or component of application architecture 100 may represent a set of executable software instructions and the corresponding hardware (e.g., memory and processor) for executing the instructions. The various functional modules and components shown in application architecture 100 may reside on a single server, or may be distributed across several servers in various arrangements.

Presentation layer 102 can include various interfaces for enabling communications between client devices and servers (not shown) of application architecture 100. These interfaces may include a web interface, a standalone desktop application interface, a mobile application (app) interface, restful state transfer (REST) application programming interface (API) or other API, a command-line interface, a voice command interface, or other suitable interface for exchanging data between clients and servers of application architecture 100. The interfaces can receive requests from various client devices, and in response to the received requests, the servers of presentation layer 102 can access the servers of application layer 104 to communicate appropriate responses to the requesting devices. In addition, the interfaces can allow users to visualize evaluations of dynamically generated machine learning models that represent specific improvements over prior art systems, including improvements to user interfaces for computing devices. These improvements are discussed further below with respect to FIG. 3 and elsewhere in the present disclosure.

Application layer 104 can include a number of components for facilitating the dynamic generation of machine learning models for creating item listings, such as text feature extractor 106, item specific feature extractor 108, user account feature extractor 110, image feature extractor 112, objective targeter 114, optimizer 116, feature vector builder 118, machine learning modeler 120, machine learning model evaluator 122, and delta engine 124. The models may be characterized as dynamically generated because they are constructed contemporaneously with receiving input for a new item listing. That is, the models can be constructed in real-time or near real-time (e.g., without noticeable delay by a human user or exceeding a minimum latency threshold). Although the elements of application layer 104 are shown to be separate and distinct components in this example, other embodiments may integrate one or more of the elements, divide a component of application layer 104 into additional components, divide and combine components into other logical units, or otherwise utilize a different configuration for application architecture 100.

Text feature extractor 106 can segment text and identify the features and corresponding feature values for each unit of text. In this example, text feature extractor 106 can segment text into smaller, more manageable units of words and phrases (e.g., tokens) for analysis. In other embodiments, text feature extractor 106 may segment text into smaller units of text (e.g., characters or sets of characters) or larger units of text (e.g., sentences, paragraphs, sections, etc.). After parsing and separating text into discrete units for analysis, text feature extractor 106 can identify features of each unit. A feature is generally a quality of an object that can define the object in part and may be used to compare the similarities or differences between objects. Some examples of text features include lexical features, semantic features, syntactic features, and metadata-based features.

Lexical features generally identify the relationships between words and phrases of text. An example of a lexical feature is the term frequency-inverse document frequency (tf-idf) of a word or phrase. The tf-idf score measures the relevance of the word or phrase in a collection or corpus based on how often the word or phrase appears in a segment of text and how often the word or phrase appears over the entirety of the collection or corpus of text. Other examples of lexical features include the part of speech of a word or phrase, the probability that certain words and phrases repeat in the same segment (e.g., there may be a low probability that "don't" appears twice in the same sentence), or the pairwise or sequential probability of words and phrases (e.g., the probability a pair of words or a sequence of words occurring one after another in a sentence, paragraph, or other unit of text).

Semantic features can measure the similarities and differences in the meanings of words and phrases of the text. Some examples of semantic features include those based on semantic networks and corpus-based measures. Semantic networks are graphs used to represent the similarity or relatedness of words and phrases of text. An example of a semantic network is WordNet, an English-language database that groups words into sets of synonyms (referred to as "synsets") and annotates relationships between synsets, such as hypernyms, hyponyms, troponyms, and entailments (e.g., variations of is-a-kind-of relationships between words and phrases), coordinate terms (e.g., words that share a hypernym), meronyms and holonyms (e.g., words and phrases having is-a-part-of relationship), etc. Various semantic features use different ways of measuring similarity between a pair of words based on how to traverse a semantic network and how to quantify nodes (e.g., words) and edges (e.g., relationships) during traversal. Examples of ways to traverse a semantic graph include the Least Common Subsumer, Path Distance Similarity, Lexical Chains, Overlapping Glosses, and Vector Pairs. The Least Common Subsumer uses is-a-kind-of relationships to measure the similarity between a pair of words by locating the most specific concept which is an ancestor of both words. One example for quantifying the semantic similarity calculates the "information content" of a concept as negative log d, where d is the depth of the tree including the pair of words having the least common subsumer as its root, and where the similarity is a value between 0 and 1 (e.g., Resnik semantic similarity). Variations of the Least Common Subsumer normalize the information content for the least common subsumer, such as by calculating the sum of the information content of the pair of words and scaling the information content for the least common subsumer by this sum (e.g., Lin semantic similarity) or taking the difference of this sum and the information content of the least common subsumer (e.g., Jiang & Conrath semantic similarity).

Path Distance Similarity measures the semantic similarity of a pair of words based on the shortest path that connects them in the is-a-kind-of (e.g., hypernym/hyponym) taxonomy. Variations of Path Distance Similarity normalize the shortest path value using the depths of the pair of words in the taxonomy (e.g., Wu & Palmer semantic similarity) or the maximum depth of the taxonomy (e.g., Leacock and Chodorow).

Lexical Chains measure semantic relatedness by identifying lexical chains associating two concepts, and classifying relatedness of a pair of words, such as "extra-strong," "strong," and "medium-strong." Overlapping glosses measure semantic relatedness using the "glosses" (e.g., brief definition or concept of a synset) of two synsets, and quantifies relatedness as the sum of the squares of the overlap lengths. Vector pairs measure semantic relatedness using co-occurrence matrices for words in the glosses from a particular corpus and represent each gloss as a vector of the average of the co-occurrence matrices.

Corpus-based semantic features quantify semantic similarity between a pair of words from large bodies of text, such as Internet indices, encyclopedias, newspaper archives, etc. Examples of methods for extracting corpus-based semantic features from text include Hyperspace Analogue to Language (HAL), Latent Semantic Analysis (LSA), Latent Dirichletian Allocation (LDA), Explicit Semantic Analysis (ESA), Pointwise Mutual Information-Information Retrieval (PMI-IR). Normalized Google® Distance (NGD), and Distributionally similar words using Co-occurrences (DISCO), among others. HAL computes matrices in which each matrix element represents the strength of association between a word represented by a row and a word represented by a column. As text is analyzed, a focus word is placed at the beginning of a ten-word window that records which neighboring words are counted as co-occurring. Matrix values are accumulated by weighting the co-occurrence inversely proportional to the distance from the focus word, with closer neighboring words weighted higher. HAL also records word-ordering information by treating co-occurrences differently based on whether the neighboring word appears before or after the focus word.

LSA computes matrices in which each matrix element represents a word count per paragraph of a text with each row representing a unique word and each column representing a paragraph of the text. LSA uses singular value decomposition (SVD) to reduce the number of columns while preserving the similarity structure among rows. Words are then compared by taking the cosine angle between the two vectors formed by any two rows.

A variation of LSA is LDA in that both treat each document as a mixture of various topics of a corpus. However, while LSA utilizes a uniform Dirichletian prior distribution model (e.g., a type of probability distribution in which the probability of each bin of the distribution is between 0 and 1, and the sum of the probabilities is equal to 1), LDA utilizes a sparse Dirichletian prior distribution model. LDA involves randomly assigning each word in each text to one of k topics to produce topic representations for all documents and word distributions for all topics. After these preliminary topic representations and word distribution are determined, LDA computes, for each text and each word in the text, the percentage of words in the text that were generated from a particular topic and the percentage of that topic that came from a particular word across all texts. LDA will reassign a word to a new topic when the product of the percentage of the new topic in the text and the percentage of the word in the new topic exceeds the product of the percentage of the previous topic in the text and the percentage of the word in the previous topic. After many iterations, LDA may converge to a steady state (e.g., the topics converge into k distinct topics). Because LDA is unsupervised, it may converge to very different topics with only slight variations in training data. Some variants of LDA, such as seeded LDA or semi-supervised LDA, can be seeded with terms specific to known topics to ensure that these topics are consistently identified.

ESA represents words as high-dimensional text feature vectors with each vector element of a vector representing the tf-idf weight of a word relative to a body of text. The semantic relatedness between words may be quantified as the cosine similarity measure between the corresponding text feature vectors.

PMI-IR computes the similarity of a pair of words using search engine querying to identify how often two words co-occur near each other on a web page as a semantic feature. A variation of PMI-IR measures semantic similarity based on the number of hits returned by a search engine for a pair of words individually and the number of hits for the combination of the pair (e.g., Normalized Google Distance). DISCO computes distributional similarity between words using a context window of size ±3 words for counting co-occurrences. DISCO can receive a pair of words, retrieve the word vectors for each word from an index of a corpus, and compute cosine similarity between the word vectors. Example implementations of semantic similarity measures can be found in the WordNet::Similarity and Natural Language Toolkit (NLTK) packages.

In other embodiments, text feature extractor 106 may additionally or alternatively calculate other text-based features, such as character-based features or term-based features. Character-based features determine the similarity of a pair of strings or the extent to which they share similar character sequences. Examples of character-based features include Longest Common Substring (LCS), Damerau-Levenshtein, Jaro, Needleman-Wunsch, Smith-Waterman, and N-gram, among others. LCS measures the similarity between two strings as the length of the longest contiguous chain of characters in both strings. Damerau-Levenshtein measures the distance between two strings by counting the minimum number of operations to transform one string into the other. Jaro measures similarity between two strings using the number and order of common characters between the two strings. Needleman-Wunsch measures similarity by performing a global alignment to identify the best alignment over the entire of two sequences. Smith-Waterman measures similarity by performing a local alignment to identify the best alignment over the conserved domain of two sequences. N-grams measure similarity using the n-grams (e.g., a subsequence of n items of a sequence of text) from each character or word in the two strings. Distance is computed by dividing the number of similar n-grams by the maximal number of n-grams.

Term-based features can also measure similarity between strings but analyze similarity at the word level (instead of the substring level) using various numeric measures of similarity, distance, density, and the like. Examples of term-based similarity measures include the Euclidean distance, Manhattan distance, cosine similarity, Jaccard similarity, and matching coefficients. The Euclidean distance (sometimes also referred to as the L2 distance) is the square root of the sum of squared differences between corresponding elements of a pair of feature vectors. The Manhattan distance (sometimes referred to as the block distance, boxcar distance, absolute value distance, L1 distance, or city block distance) is the sum of the differences of the distances it would take to travel to get from one feature value of a first text feature vector to a corresponding feature value of a second text feature vector if a grid-like path is followed. Cosine similarity involves calculating the inner product space of two text feature vectors and measuring similarity based on the cosine of the angle between them. Jaccard similarity is the number of shared words and phrases over the number of all unique terms in both text feature vectors.

In some embodiments, text feature extractor 106 may identify features of an item listing based on its metadata, such as the number of characters or the number words in the listing's title, description, or other text. Other textual features may be based on text formatting, such as the font, font size, font color, bolding, underlining, italicizing, headings, numbering, bulleting, indentations, paragraph alignment, line spacing, and other formatting elements. In some embodiments, text feature extractor 106 may be capable of identifying the tense (e.g., past, present, future, etc.), perspective (e.g., first, second, or third person), conciseness (e.g., multiple vs. a plurality of), tone, and other writing styles or properties of text apart from its meaning (e.g., semantic qualities), importance (e.g., lexical qualities), or structure (e.g., syntactic qualities).

Item specific feature extractor 108 can comprise a number of adapters for translating, transforming, or otherwise processing the values of item specifics (e.g., manufacturer, model, color, etc.) from one form to another form more suitable for analyzing the item listings for a particular context. For instance, the values of item specifics of item listings may not map to their actual values but may instead map to enumerators, numeric keys, or other representations of value for item specifics. Item specific feature extractor 108 may include an adapter for re-mapping a value for an item specific from a numeric representation to a string representation for semantic or lexical analysis. As an example, the manufacturers of an item may comprise Alpha Co., Beta, Inc., and Gamma Corp. Instead of populating the values of the manufacturer attribute of item listings with the string of a manufacturer's name, the values used are 1, 2, and 3 (which can represent an enumeration of the set of manufacturers' names, a key into a database table including manufacturer information, or other mapping of a number to a string). The adapter for item specific feature extractor 108 may re-map the value of the manufacturer's name from a numeric representation to a string representation for semantic or lexical analysis. As another example, an item specific may be conditional (e.g., whether an item is waterproof or not) and, thus the value for the attribute is a Boolean value, such as true or 1 or false or 0. It may not be useful to extract "true" or "1" or "false" or 0 for purposes of semantic or textual analysis but it may be useful to append the term "waterproof" to a feature vector for an item if the condition is true and exclude the term from the feature vector if the condition is false. The adapter for item specific feature extractor 108 may translate the value of the item specific from a Boolean representation to a string representation for text-based analysis. As yet another example, a value of an item specific may be a compressed string or other encoding. Item specific feature extractor 108 can include an adapter for decompressing the string or decoding the value of the item specific for textual analysis. For these examples and other examples in which a value of an item specific is stored as a mapping, item specific feature extractor 108 can remap, translate, transform, decode, or otherwise process the value of an item specific from an ambiguous representation to a less ambiguous representation.

Item specific feature extractor 108 can also include adapters for merging multiple item specific values to fewer feature values or vice versa. For example, an item listing may include a height, length, and width of an item as separate item specifics, and an adapter can combine these item specific values by calculating the volume (e.g., height×length×width) of the item and using the volume as a feature for comparing the item listing to other item listings. Alternatively or in addition, item specific feature extractor 108 can include an adapter for converting a single value for an item specific into multiple feature values. As another example, item specific feature extractor 108 can include an adapter for concatenating several item specific values (e.g., manufacturer, model, compliance with a particular industry standard, etc.) to form a single feature value for text-based analysis. Alternatively or in addition, item specific feature extractor 108 may include an adapter for combining multiple attribute values for item specifics into a single feature value comprising a range of the multiple attribute values (e.g., supports AcmeOS version 1.xx-3.xx, fits ages 10-12, averages between 20-25 miles per gallon, etc.). Alternatively or in addition, item specific feature extractor 108 may include an adapter for separating a single value for an item specific expressed as a range into multiple feature values for each value within the range.

In some embodiments, item specific feature extractor 108 can also include adapters for identifying text-based features in images or videos or vice versa. For example, item specific feature extractor 108 can include objection recognition functionality for identifying an item represented in an image or video, the color of the item, the age or condition of the item, the make and model of the item, or other item specific. Alternatively or in addition, text may include icons, its background may comprise image data, or the text itself may appear to be a graphical object (e.g., emoticon, emoji, Ascii art, etc.).

User account feature extractor 110 can include processes for acquiring user preferences for putting together item listings, such as preferences for a target objective of dynamically generated machine learning models for optimizing creation of the listings. Target objectives can include selling an item for a specific price, price range, or maximum price; selling the item with a specific degree of certainty, a range of possibilities, or a maximum probability; selling the item by a specific date, range of dates, or the earliest date; selling the item while incurring a specific fee amount, a range of fee amounts, or a minimum fee amount; achieving a specific number of impressions, range of numbers of impressions, or maximum number of impressions for the item listing, or a combination of these objectives or other target objectives. The user preferences may be explicit, and a user can set specific objectives, rank objectives by order of preference, or designate weights among multiple objectives. In some embodiments, the user preferences may be implicit and determined based on a specific user's historical behavior and/or the behavior of a group of users sharing similar traits.

User account feature extractor 110 can also extract features from the values of attributes of a user account that may be a relevant to a target objective for an item listing. For example, the target objective may relate to satisfying a sales criterion (e.g., maximizing a selling price or the selling probability of an item). User account feature extractor 110 can query user accounts database 132 to retrieve features of a user account (e.g., a user account associated with a user creating a particular item listing, a user account of multiple users sharing demographic traits or behavior with the listing user, etc.). These features may include a user account rating as a seller, a user account rating as a buyer, or an aggregate user account rating; positive feedback percentage (e.g., a ratio between positive feedback and negative feedback) as a seller or a buyer or an aggregate positive feedback percentage; text of user account feedback as a seller, text of user account feedback as a buyer, or aggregate text of user account feedback; a date a user account was created, an indicator that a user account is associated with a store, among other user account features.

Image feature extractor 112 can include various elements for extracting features from image data (e.g., photographs and videos) to assess the quality of the image data (e.g., sharpness, noise, dynamic range, tone, color/exposure accuracy, etc.), compare similarities and differences with similar items, evaluate the age or condition of the item, identify defects, or other computer vision processing. Image features can include points, edges, or regions of interest. Point of interest or key points can include the intersections of edges, high variance points, local curvature discontinuities of Gabor wavelets, inflection points of curves, local extrema of wavelet transforms, Harris corners, Shi Tomasi points, or scale-invariant feature transform (SIFT) key points, among others. Edges can mark the boundaries between regions of different colors, intensities, or textures. Some examples of edge-based features include Canny edges, Shen-Castan (ISEF) edges, Marr-Hildreth edges, Lindeberg edges, phase stretch transform (PST) edges, and random sample consensus (RANSAC) lines, among others. Image feature extractor 112 may also identify regions of interest in image data. These regions of interest may be detected based on Laplacian of Gaussian (LoG) regions, difference of Gaussian regions (DoG), determinant of Hessian (DoH) regions, and maximally stable extremum regions (MSERs), determinant of Hessian blobs, and maximally stable extremum regions (MSERs), among many others.

Image features can also include color, texture, shapes, or frequency-domain features. Image feature extractor 112 can encode the color of image data using histograms (e.g., distributions of the number of pixels of each color of the image data), color coherent vectors (CCVs) (e.g., a special type of histogram that accounts for spatial information by partitioning histogram bins as coherent where a color is a part of a common region and incoherent otherwise), color moments and moment invariants (e.g., an index of a set of colors of the image data and where each color is located in the image data), or color SIFT key points. Image feature extractor 112 can also identify textures within image data, such as by computing a gray level co-occurrence matrix (GCLM) (e.g., motion estimation from measures of the angular second moment, correlation, inverse difference moment, and entropy), Haralick texture matrix (e.g., information regarding texture patterns in the image data), or visual texture descriptors (e.g., measures of regularity, directionality, and coarseness of discrete regions of the image data). Image features can also be determined transforming an image represented by $f(x,y)$ of size M×N to a representation $F(u,v)$ in the frequency domain, and extracting features from $F(u,v)$. Some examples of frequency-domain features include binary robust independent elementary features (BRIEF), oriented fast and rotated BRIEF (ORB), binary robust invariant scalable key points (BRISK), and fast retina key points (FREAKs).

Objective targeter 114 determines a target objective for an item listing and dynamically generated machine learning models for the item listing. As discussed, examples of target objectives include selling goals (e.g., selling an item for a particular price, selling the item with a particular degree of certainty, selling the item by a particular date, selling the item to incur a particular amount of fees), impression goals (e.g., receiving a particular number of impressions for an item listing), and other types of goals (e.g., increasing market share, building up a user account rating, etc.). In some embodiments, objective targeter 114 may determine the target objective on the basis of user preferences, which the system can store in user accounts database 132. In addition or alternatively, objective targeter 114 may analyze historical user behavior of a specific user or a group of users sharing common traits to determine the target objective. For example, objective targeter 114 can analyze historical item listings stored in item listings database 136 for certain categories stored in categories database 134 and associated with the specific user or group of users to determine the target objective for a new item listing.

Optimizer 116 facilitates real-time or near real-time machine learning modeling and visualization by performing certain operations to optimize feature extraction, objective targeting, feature vector building, distance calculates, machine learning modeling, and/or visualization. In some embodiments, optimizer can "pre-load" or "pre-cache" previous item listings that may be relevant to a new item listing. This can involve loading previous item listings into memory prior to when the system will process the listings. For example, application layer 104 can include an interface that allows users to initiate construction of a new item listing by selecting one or more categories for the new listing (e.g., electronics) and/or identifying a specific type of item (e.g., make and model) associated with the new listing. Upon selection of the category or categories and/or specific item type, optimizer 116 may retrieve a predetermined number of item listings (e.g., all item listings, a number of items specified by the system, or a number of items specified by the user, etc.) that have ended from sale or expiration by a predetermined date (e.g., past 3 months up to the current date and time, a date specified by the system, or a date specified by the user, etc.) from item listings database 136. In some situations, there may be a minimum or maximum number of item listings, and the system and/or the user can broaden (or narrow) the category or date range to satisfy the minimum (or maximum) threshold. Optimizer 116 may fetch the item listings from item listings database 136, load or cache the item listings in in-memory resources 138 (e.g., cache, memory, memcache, etc.), and maintain the item listings in in-memory resources 138 at least until the new item listing is completed. Optimizer 116 can also load and store the machine learning models and their evaluations in in-memory resources 138. This can occur while the user begins filling out other attributes of the new item listing. In this manner, the system can support real-time or near real-time machine learning modeling, evaluation, and visualization.

Feature vector builder 118 can determine a representation for the extracted features of each item listing. In a process sometimes referred to as fusion, feature vector builder 118 can combine the features of an item listing into a data object (e.g., feature vector) that can operate as a sample or data point of machine learning modeler 120. Feature vector builder 118 can implement early fusion or late fusion. In early fusion, feature values may be concatenated to form a vector, array, list, matrix, or similar data structure. In some embodiments, the vector may be dense and each position of the vector can comprise a feature as a key and a feature value as a value of a key-value pair. In other embodiments, the vector may be sparse and each position of the vector can represent a different feature and the vector includes a feature when there is a non-null value at the corresponding position of the vector. Features may be derived from various domains (e.g., quantitative, semantical, lexical, syntactic, image, user, etc.), and a feature vector in an early fusion system can combine disparate feature types or domains. Early fusion may be effective for a feature set of similar features or features within the same domain (e.g., semantic features of a title of an item listing and a description of the item listing). Early fusion may be less effective for distant features or features from different domains (e.g., syntactic features of the title of the item listing versus image features of the item listing's photos or videos).

In late fusion, features in the same domain may be combined and each feature vector can be input into a separate, domain-specific machine learning system and later joined for a final evaluation by the system. The domain-specific machine learning systems may use the same or different machine learning algorithms. A collection of feature vectors from each domain-specific machine learning system can represent one item listing.

In other embodiments, the results of each individual domain-specific machine learning system for an item listing may be compared with one another, such as by generating a similarity vector in which each position of the vector is the similarity between a pair of item listings along one domain, and a final evaluation may be based on averaging, weighted averaging, or percentiling/binning. In averaging, the similarity S of two item listings j and k can be the sum of the value of each position of the similarity vector v divided by the length n of the similarity vector. For example:

$$S_{j;k} = (\Sigma_{i=0}^{n-1} v(i))/n \qquad \text{(Equation 1)}$$

Weighted averaging may apply different weights w to the positions of the similarity vector v to determine the similarity between the item listings j and k. For example:

$$S_{j;k} = (\Sigma_{i=0}^{n-1} w_i v(i))/n, \text{ where } \Sigma_{i=0}^{n-1} w_i = 1 \qquad \text{(Equation 2)}$$

Weights can be user-specified or automatically obtained, such as via silhouette scores. A silhouette score is a measure of how similar an object is to its own cluster or class compared to other clusters or other classes, which can range from −1 to 1, where a high value indicates that an item listing is well matched to its own cluster or class and badly matched to neighboring clusters or classes. If most item listings have a high silhouette score, then the clustering or classification maybe accurate. If many item listing have a low or negative silhouette score, then the clustering or classification may have too many or too few clusters or classes. The silhouette score can be calculated with any similarity or distance metric, such as the Euclidean distance or the Manhattan distance. Percentiling or binning maps the value of each position of a similarity vector to percentiles or bins to account for different similarity distributions. That is, similarity vectors are sorted and bins of the sorted vectors are created according to a particular probability distribution (e.g., normal or Gaussian, Poisson, Weibull, etc.). For example, the probability P, for a probability density function f, that an item listing X belongs to a cluster or class associated with a percentile/bin over interval a and b may be defined as:

$$P = [a \leq X \leq b] = \int_a^b f(x)dx \qquad \text{(Equation 3)}$$

In still other embodiments, late fusion can involve various set operations. For example, late fusion may define clusters or classes as the intersections, unions, or complements of feature vectors. That is, if a feature vector determined by a first machine learning system includes the values $\{1, 2, 3, 4\}$ and a second feature vector determined by a second machine learning system includes the values $\{3, 4, 5\}$, then the intersection operation may result in clusters or classes $\{1\}$, $\{2\}, \{3, 4\}$, and $\{5\}$. On the other hand, applying the union operation to the first and second feature vectors may yield a single cluster or class $\{1, 2, 3, 4, 5\}$.

In some embodiments, feature vector builder 118 can also handle missing data or process data to handle outlier values. Feature vector builder 118 may delete missing or outlier values or replace missing or outlier values with mean, median, or mode values in some situations. In other situations, feature vector builder 118 may predict missing or outlier values using machine learning techniques, such as MMSE, MAP estimation, MLE, PCA, or other techniques discussed in the present disclosure.

Machine learning modeler 120 can determine the parameters and functions (e.g., a machine learning model) that may be optimal for achieving a target objective. This can include identifying a suitable machine learning algorithm. In some embodiments, a user may select the machine learning algorithm(s) as part of generating the new item listing, or the selected machine learning algorithm(s) may have previously been chosen as a user preference. In addition or alternatively, the system can select the machine learning algorithm(s) based on historical analyses (including a/b testing) indicating that a particular machine learning algorithm provides an especially accurate prediction for the outcome of an item listing or that the algorithm is especially successful in achieving the target objective.

Machine learning algorithms utilized by machine learning modeler 120 can include parameter estimation methods, unsupervised clustering or classification methods, and supervised clustering or classification methods. Parameter estimation methods determine a parametric description of an object, process, or event based on the features of the object, process, or event. For example, given a number of outcomes for item listings (e.g., sold or expired), an aim of parameter estimation can be to determine the relationship of the attributes of each item listing that resulted in a particular outcome. Some examples of parameter estimation methods include Bayesian estimation (e.g., minimum mean square error (MMSE) estimation or maximum a posteriori (MAP) estimation, maximum likelihood estimation (MLE), etc.), fitting techniques (e.g., sum of squared difference estimation, robust estimation, etc.), and regression.

Bayesian estimation is based on Bayes' theorem for conditional probabilities, which posits that the probability of x given that z already exists or has occurred equals the probability of x and z happening together divided by the probability of z. Formally, this can be referred to as the posterior probability density function $p(x|z)$:

$$p(x|z) = (p(z|x)p(x))/p(z), \qquad \text{(Equation 4)}$$

The optimization criterion of Bayes, minimum risk or maximum posterior expectation, is applicable when it is possible to quantify cost if estimates differ from true parameters and the expectation of the cost is acceptable as an optimization criterion. Cost function $C(\hat{x}|x): \mathbb{R}^M \to \mathbb{R}^N$ can represent a true cost. However, it may be difficult to quantify cost accurately and it is oftentimes more practical to select a cost function whose mathematical treatment is not overly complex and to assume that the cost function depends on the difference between the estimated and true parameters, such as by computing the estimation error $e = \hat{x} - x$. Given these assumptions, some embodiments may utilize the minimum means square error (MMSE) estimator as a Bayesian estimator. MMSE can be formally defined as:

$$\hat{x}_{MMSE}z = E[x|z] = \int_x x p(x|z) dx \qquad \text{(Equation 5)}$$

Other embodiments may utilize the maximum a posteriori (MAP) estimator as the Bayesian estimator. MAP can be defined as:

$$\hat{x}_{MAP}z = \underset{x}{\text{argmax}}\left\{\frac{p(z|x)p(x)}{p(x)}\right\} = \underset{x}{\text{argmax}}\{p(z|x)p(x)\} \qquad \text{(Equation 6)}$$

Still other embodiments may utilize maximum likelihood estimation (MLE). MLE is based on the observation that in MAP estimation, the peak of p(z|x) is when p(x) is almost constant. This can be especially true if little prior knowledge is available. In these cases, the prior density p(x) does not affect the position of the maximum very much. Discarding p(x) and maximizing the function p(z|x) leads to the MLE:

$$\hat{x}_{MLE}z = \underset{x}{\text{argmin}}\{p(z|x)\} \qquad \text{(Equation 7)}$$

Data-fitting techniques model the measurement process as z=h(x)+v, where h(x) is the measurement function that models a system and v represents noise, error, and other disturbances. In data-fitting, the purpose is to find the parameter vector x that best fits the measurements z. However, if $\hat{x}$ (e.g., a prediction) is an estimate of x, determining $\hat{x}$ can at most predict the modeled part of z but cannot predict the disturbances. The disturbances, referred to as residuals ε, constitute the differences between observed and predicted measurements ($\varepsilon = z - h(\hat{x})$), and data fitting techniques identify the estimate 2 that minimizes an error norm $\|\varepsilon\|$. Different error norms can lead to different data fits.

An error norm utilized by some embodiments is the sum of squared differences (SSD) or least squared error norm (LS norm):

$$\|\varepsilon\|_2^2 = \sum_{n=0}^{N-1} \varepsilon_n^2 = \sum_{n=0}^{N-1}(z_n - h_n(\hat{x}))^2 = (z - h(\hat{x}))^T(z - h(\hat{x})) \qquad \text{(Equation 8)}$$

The least squares fit, or least squares estimate, is the parameter vector that minimizes the norm:

$$\hat{x}_{LS}(z) = \underset{x}{\text{argmin}}\{(z - h(\hat{x}))^T(z - h(\hat{x}))\} \qquad \text{(Equation 9)}$$

Other embodiments may utilize the robust error norm:

$$\|\varepsilon\|_{robust} = \sum_{n=0}^{N-1} \rho(\varepsilon_n) = \sum_{n=0}^{N-1} \rho(z_n - h_n(\hat{x})), \qquad \text{(Equation 10)}$$

where ρ(x) measures the size of each individual residual $z_n - h_n(\hat{x})$. The robust error norm may be preferred to the LS norm when there are a small number of large measurement errors or outliers and the influence of these outliers are overdetermined in view of errors being weighted quadratically. The robust error norm can operate as the bounds for the outliers.

Regression attempts to determine an empirical function that defines a data set. Regression analyzes pairwise measurements t, a measurement without any appreciable error referred to as the independent variable, and z, a prediction arising from t. It assumes that some empirical function f(x) can predict z from the independent variable t. Regression also posits that a parameter vector x can be used to control the behavior of f(x). Thus, regression can be modeled as z=f(t,x)+ε, where f(x) is the regression function and ε is the residual (e.g., the part of z that cannot be predicted by f(x)). The residual can originate from noise or other sources of randomness, which can make the prediction uncertain. However, the residual can also be caused by an inadequate choice of the regression curve. A goal of regression is to determine an estimate of the parameter vector x based on N observations ($t_n$, $z_n$) for n=0 . . . , N−1 that minimizes the residuals $\varepsilon_n$. The observations $z_n$ can be stacked in a vector z, and the problem of finding $\hat{x}$ can be given as:

$$z = h(\hat{x}) + \varepsilon \text{ with } z \stackrel{def}{=} \begin{bmatrix} z_0 \\ \vdots \\ z_{n-1} \end{bmatrix}, \qquad \text{(Equation 11)}$$

$$h(x) \stackrel{def}{=} \begin{bmatrix} f(t_0, x) \\ f(t_{N-1}, x) \end{bmatrix}, \text{ and}$$

$$\varepsilon \stackrel{def}{=} \begin{bmatrix} \varepsilon_0 \\ \vdots \\ \varepsilon_{n-1} \end{bmatrix},$$

where ε is the vector that embodies the residuals on. Since the model is in the standard form, x can be estimated with a least squares approach. Alternatively, robust regression analysis may be used to minimize the robust error norm.

In other embodiments, machine learning modeler 120 may utilize unsupervised learning methods for determining how item listings relate to one another and the attributes of the item listings that form clusters, such as by binning clusters and determining the size of each bin/cluster using a distribution curve (e.g., bell curve, exponential curve, Poisson curve, or other curve discussed in the present disclosure). In unsupervised learning, the input data set may not be pre-labeled, and the system can process the data set to provide as input to a machine learning algorithm to learn how samples may be similar to one another and the features that may be especially cogent for distinguishing similarities and differences among samples. Examples of unsupervised learning techniques include clustering, principle component analysis (PCA), and other methods discussed throughout the present disclosure.

Clustering methods can include k-means clustering, hierarchical clustering, density-based clustering, grid-based clustering, and variations of these algorithms. In k-means clustering, a number of n data points are partitioned into k clusters such that each point belongs to a cluster with the nearest mean. The algorithm proceeds by alternating steps, assignment and update. During assignment, each point is assigned to a cluster whose mean yields the least within-cluster sum of squares (WCSS) (e.g., the nearest mean). During update, the new means is calculated to be the centroids of the points in the new clusters. Convergence is achieved when the assignments no longer change. One variation of k-means clustering dynamically adjusts the number of clusters by merging and splitting clusters according to predefined thresholds. The new k is used as the expected number of clusters for the next iteration (e.g., ISODATA). Another variation of k-means clustering uses real data points (medoids) as the cluster centers (e.g., PAM).

Hierarchical clustering methods sort data into a hierarchical structure (e.g., tree, weighted graph, etc.) based on a similarity measure. Hierarchical clustering can be categorized as divisive or agglomerate. Divisive hierarchical clustering involves splitting or decomposing "central" nodes of the hierarchical structure where the measure of "centrality" can be based on "degree" centrality, (e.g., a node having the most number of edges incident on the node or the most number of edges to and/or from the node), "betweenness" centrality (e.g., a node operating the most number of times as a bridge along the shortest path between two nodes), "closeness" centrality (e.g., a node having the minimum average length of the shortest path between the node and all other nodes of the graph), among others (e.g., Eigenvector centrality, percolation centrality, cross-clique centrality, Freeman centrality, etc.). Agglomerative clustering takes an opposite approach from divisive hierarchical clustering. Instead of beginning from the top of the hierarchy to the bottom, agglomerative clustering traverses the hierarchy from the bottom to the top. In such an approach, clustering may be initiated with individual nodes and gradually combine nodes or groups of nodes together to form larger clusters. Certain measures of the quality of the cluster determine the nodes to group together at each iteration. A common measure of such quality is graph modularity.

Density-based clustering is premised on the idea that data points are distributed according to a limited number of probability distributions that can be derived from certain density functions (e.g., multivariate Gaussian, t-distribution, or variations) that may differ only in parameters. If the distributions are known, finding the clusters of a data set becomes a matter of estimating the parameters of a finite set of underlying models. EM is an iterative process for finding the maximum likelihood or maximum a posteriori estimates of parameters in a statistical model, where the model depends on unobserved latent variables. The EM iteration alternates between performing an expectation (E) step, which creates a function for the expectation of the log-likelihood evaluated using the current estimate for the parameters, and a maximization (M) step, which computes parameters maximizing the expected log-likelihood found during the E step. These parameter-estimates are then used to determine the distribution of the latent variables in the next E step.

Grid-based clustering divides a data space into a set of cells or cubes by a grid. This structure is then used as a basis for determining the final data partitioning. Examples of grid-based clustering include Wave Clustering and Statistical Information Grid (STING). Wave clustering fits the data space onto a multi-dimensional grid, transforms the grid by applying wavelet transformations, and identifies dense regions in the transformed data space. STING divides a data space into rectangular cells and computes various features for each cell (e.g., mean, maximum value, minimum value, etc.). Features of higher level cells are computed from lower level cells. Dense clusters can be identified based on count and cell size information.

PCA uses an orthogonal transformation to convert a set of data points of possibly correlated variables into a set of values of linearly uncorrelated variables called principal components. The number of principal components is less than or equal to the number of original variables. This transformation is defined in a manner such that the first principal component has the largest possible variance (e.g., the principal component accounts for as much of the variability in the data as possible), and each succeeding component in turn has the highest variance possible under the constraint that it is orthogonal to the preceding components. The resulting vectors are an uncorrelated orthogonal basis set.

In some embodiments, machine learning modeler 120 may utilize supervised learning methods for determining how attributes affect the outcomes of item listings, such as whether an item listing results in a sale or expires due to no sale. Alternatively or in addition, machine learning modeler 120 may bin classifications and utilize a distribution curve to determine the size of each bin/classification. For example, if the target objective is to determine the selling probability for a new item listing, a system can segment previous item listings for generating a machine learning model into 10 bins with each bin representing a 10n (for n=0, 1, 2, . . . , 9) percent probability that a classifier correctly classifies whether a previous item listing results in a sale or results in no sale. In addition to modeling a classifier for identifying the attributes that determine whether a previous item listing sells or not, the system can also model the distribution of the previous item listings in the bins to fit a particular distribution curve.

Supervised learning methods operate on pre-labeled data. A system can acquire the pre-labeled data, classified according to predetermined criteria, to learn the model (e.g., extrapolate the features and feature values) for mapping new unclassified samples to one or more classifications. For example, the system can receive outcomes of previous item listings (e.g., sold or expired) and learn the features from the feature vectors of the previous listings that are pertinent to whether an item is sold or unsold. In conventional systems, a human user labels the training data, which can be laborious and error-prone. Various embodiments of the present disclosure can overcome these deficiencies by automating labeling, such as by processing transactional data indicating that an item associated with an item listing sold or the item listing expired.

Some examples of supervised learning algorithms include k-nearest neighbor (a variation of the k-means algorithm discussed above), boosting, perceptrons/neural networks, decision trees/random forests, support vector machines (SVMs), among others. Boosting methods attempt to identify a highly accurate hypothesis (e.g., low error rate) from a combination of many "weak" hypotheses (e.g., substantial error rate). Given a data set comprising examples within a class and not within the class and weights based on the difficulty of classifying an example and a weak set of classifiers, boosting generates and calls a new weak classifier in each of a series of rounds. For each call, the distribution of weights is updated to reflect the importance of examples in the data set for the classification. On each round, the weights of each incorrectly classified example are increased, and the weights of each correctly classified example is decreased so the new classifier focuses on the difficult examples (i.e., those examples have not been correctly classified). Example implementations of boosting include Adaptive Boosting (AdaBoost), Gradient Tree Boosting, or XGBoost.

Neural networks are inspired by biological neural networks and comprise an interconnected group of functions or classifiers (e.g., perceptrons) that process information using a connectionist approach. Neural networks change their structure during training, such as by merging overlapping detections within one network and training an arbitration network to combine the results from different networks. Examples of neural network algorithms include the multi-layer neural network, the auto associative neural network, the probabilistic decision-based neural network (PDBNN), and the sparse network of winnows (SNOW).

Random forests rely on a combination of decision trees in which each tree depends on the values of a random vector sampled independently and with the same distribution for all trees in the forest. A random forest can be trained for some number of trees t by sampling n cases of the training data at random with replacement to create a subset of the training data. At each node, a number m of the features are selected at random from the set of all features. The feature that provides the best split is used to do a binary split on that node. At the next node, another number m of the features are selected at random and the process is repeated.

SVMs involve plotting data points in n-dimensional space (where n is the number of features of the data points) and identifying the hyper-plane that differentiates classes and maximizes the distances between the data points of the classes (referred to as the margin).

Machine learning modeler 120 can also segment the input data set (e.g., previous item listings) into a training set and a testing set. The training set can include a subset of the previous item listings applied to a machine learning algorithm to identify the parameters and functions for processing new item listings to achieve a target objective (e.g., generating a machine learning model). The testing set can include a subset of the previous item listings applied to a machine learning model to evaluate the efficacy of the model. In some embodiments, machine learning modeler 120 can also segment the input data set into a validation set, which can include a subset of the item listings applied to the model before testing to tune parameters of the model to avoid overfitting.

Machine learning model evaluator 122 can evaluate a new item listing as the user inputs it into the system to determine a state of the new item listing with respect to a target objective. For example, the target objective may be to maximize the selling price for an item listing and machine learning model evaluator 122 can take the attribute values of the new item listing that the user has entered, and apply them to the generated machine learning model. Concurrently, machine learning model evaluator 122 can evaluate alternative attribute values with respect to the target objective to identify an action the user can take to alter the predicted outcome of the new item listing and a confidence level associated with the action. For example, the user may be entering a description for the new item listing, such as "Brand new Acme Phone for sale . . . " but neglects to identify an item specific condition (e.g., new, new (other), refurbished, for parts, etc.). Machine learning model evaluator 122 may determine the selling price for the new item listing based on attribute values already entered, including the partially entered description. Simultaneously, machine learning model evaluator 122 can identify the selling price for the new item listing with the item specific condition selected (e.g., new) and the other attribute values already entered.

Delta engine 124 can identify differences between a new item listing based on the actual attribute values the user has entered for it and one or more altered item listings with one or more attribute values substitutes. In some embodiments, delta engine 124 can provide a recommendation to alter the attribute value for any change that gets the new item listing closer to the target objective or for a change that represents an improvement of the new item listing by a predetermined amount selected by the user and/or the system (e.g., at least $2.00 more for a selling price, at least a 5% increase in selling probability, etc.). In addition or alternatively, the suggestion can take into account a confidence level associated with the evaluation of the altered item listing exceeding a predetermined amount, the confidence level associated with the evaluation of the altered item listing exceeding the confidence level associated with the evaluation of the item listing as actually entered by the user by a predetermined amount, or other confidence level.

In some embodiments, delta engine 124 can measure the similarities (or equivalently, the differences or distances) between feature values of item listings. These similarity metrics may be numeric or text-based. Some examples of numeric metrics for similarity include the Minkowski distance or the Mahalanobis distance. The Minkowski distance may be appropriate where feature vectors are independent and each feature vector is of equal importance. For example, if D is the distance between feature vectors v and w, and $f_i(x)$ is the number of features in a bin i of x, the Minkowski distance is defined as:

$$D(v,w)=(\Sigma_i |f_i(v)-f_i(w)|^p)^{1/p}, \quad \text{(Equation 12)}$$

where p=1 is the $L_1$ distance (also sometimes called the Manhattan distance), p=2 is the $L_2$ distance (also known as the Euclidean distance), and p=∞ is the L∞ (also called the Chebyshev distance).

The Mahalanobis distance may be appropriate when each dimension of the feature vector is dependent of each other and is of different importance. The Mahalanobis distance is defined as:

$$D(v,w)=\sqrt{(\mathcal{F}_v - \mathbb{R}_w)^T C^{-1}(\mathbb{R}_v - \mathbb{R}_w)}, \quad \text{(Equation 13)}$$

where C is the covariance matrix of the feature vectors v and w, $\mathcal{F}_v$ and $\mathcal{F}_w$ are vectors that list all the feature values in $f_i(v)$ and $f_i(w)$.

Other numeric similarity measures that can also be used include the Quadratic Form distance, the Kullback-Leibler divergence, the Jeffrey divergence, the Hausdorff distance, the Mallows distance, the earth mover's distance, the integrated region matching distance, or variations thereof. Certain embodiments may also use various indexing structures or techniques for efficiently searching the feature set space, including multi-dimensional hashing, which maps features into fix-sized bins or buckets based on some function applied to each feature; locality sensitive hashing, which uses unions of independently computed hashing functions to index features; or multi-dimensional search trees such as k-d trees, which divide the multi-dimensional feature space along alternating axis-aligned hyperplanes to maximize search tree balance; among other approaches.

Delta engine 124 can also compute text-based similarity metrics, such as LCS, Path Distance Similarity, Lexical Chains, Overlapping Glosses, Vector Pairs, HAL, LSA, LDA, ESA, PMI-IR, Normalized Google Distance, DISCO, variations of one or more of these text-based similarity measures, or other text-based similarity measures discussed in the present disclosure.

FIG. 2 shows an example of a diagram for data flow 200 of a computing system capable of dynamically generating machine learning models and interfaces for visualizing evaluations performed by the models. For any method, process, or flow discussed herein, there can be additional, fewer, or alternative steps performed or stages that occur in similar or alternative orders, or in parallel, within the scope of various embodiments unless otherwise stated. Data flow 200 can include a modeling phase 202 and an evaluation phase 250. As discussed, conventional machine learning systems typically include a time period for human users to manually label a subset of a data collection (e.g., training data), another time period to generate a machine learning model from labeled samples, and yet another time period to apply new observations to the models to determine a label for each new observation. This can occur over a lengthy amount of time due to manual labeling and the processing of voluminous data required for machine learning modeling. The system of FIG. 2 can improve upon the deficiencies of conventional systems.

In this example, modeling phase 202 includes dynamic data selection stage 204, feature extraction stage 210, and model building stage 220. Dynamic data selection stage 204 can involve sampling or selecting item listings 206 from an online marketplace from which to generate machine learning model 228. Dynamic data selection stage 204 may include tasks such as specifying a state of the item listings (e.g., expired listings or listings of items sold), a time period of the listings (e.g., past 3-6 months of expired or sold item listings), a category or set of categories of the listings, a minimum or maximum number of listings (which the system can achieve, e.g., by increasing/decreasing the time period and/or broadening/narrowing the category or set of categories of the item listings), and other attributes 208 and associated attribute values 209, for sampling or selecting the modeling data for dynamically generating machine learning model 228. In some embodiments, the system can automatically select item listing attributes 208 (e.g., item listing status, time period, category or set of categories, etc.) and/or threshold values or ranges associated with attribute values 209 as the criteria for selecting the sampling data to use to generate machine learning model 228. For example, the system can automatically select attributes 208 and associated attribute values 209 based on a particular category or set of categories. In addition or alternatively, the system may enable a user to specify her own sampling data criteria.

In various embodiments, dynamic data selection stage 204 can occur on-the-fly or dynamically, and thus the selected data set can come from the most recently available data. Conventional systems, in contrast, typically select modeling data as part of a batch process, which can result in static models (e.g., where the conventional system does not support feedback) or models not derived from the latest data (e.g., where the system includes a feedback mechanism). In addition, unlike conventional systems, dynamic data selection stage 204 can select modeling data on a user-by-user basis with respect to a specific user or set of similar users (e.g., similar age range, gender, geographic location, level of education, income level, hobbies and interests, etc.). Dynamic data selection stage 204 can also support a-b (or a-b-c . . . -n) testing by dividing users into cohorts and selecting different sampling/modeling data for each cohort.

Feature extraction stage 210 may involve transforming, translating, or otherwise processing item listings 206 from an original form to another form more suitable for machine learning modeling. Feature extraction stage 210 can include tasks such as identifying features 214 and corresponding feature values 216 from attributes 208 and associated attribute values 209 and generating feature vector 212, a representation of the identified features and associated feature values. In some embodiments, attributes 208 and associated attribute values 209 may fall under multiple data domains (e.g., quantitative, text-based, image-based), and feature extraction stage 210 may include several passes for representing features 214 and associated feature values 216 in different domains.

From feature extraction stage 210, data flow 200 can proceed to model building stage 220 for constructing machine learning model 228. In this example, the system may receive target objective 222, distribution data 224, and feature vectors 212 as input to machine learning algorithm 226 to produce machine learning model 228. Target objective 222 can refer to a system-defined or user-defined objective for listing an item, such as to sell the item for a specific price, price range, or maximum price; sell the item with a specific degree of certainty, a range of possibilities, or a maximum probability; sell the item by a specific date, range of dates, or the earliest date; sell the item while incurring a specific fee amount, a range of fee amounts, or a minimum fee amount; achieve a specific number of impressions, range of numbers of impressions, or maximum number of impressions for the item listing; a combination of these objectives: or other target objectives discussed in the present disclosure.

Distributional data 224 can refer to probability distributions for clusters or classifications of item listings. That is, machine learning algorithm 226 can identify the features for labeling new item listings in accordance with target objective 222 but must also ensure that the labels for the previous listings fit a probability distribution, such as a binomial distribution, Poisson distribution, uniform distribution, normal distribution, exponential distribution, or other predetermined distribution. A binomial distribution can arise from a set of n experiments or trials in which each trial can result in either a success or failure, the probability p of success is the same for all trials, and the outcomes of different trials are independent:

$$p(x) = \binom{n}{x} p^x (1-p)^{n-x} \text{ for } x = 0, 1, 2, \ldots n \quad \text{(Equation 14)}$$

A Poisson distribution is a family of distributions that expresses the probability of a given number of events occurring in a fixed interval if these events occur with a known constant rate λ over a period of time:

$$p(x)=(e^{\wedge}(-\lambda)\lambda^{\wedge}x)/x! \text{ for } x=0,1,2, \ldots \quad \text{(Equation 15)}$$

A uniform distribution (e.g., rectangular distribution) is a family of symmetric probability distributions such that for each member of the family, all intervals of the same length are equally probable:

$$f(x)=1/(b-a) \text{ for } -\infty<a\leq x\leq b<\infty \quad \text{(Equation 16)}$$

A normal or Gaussian distribution (e.g., bell curve) is based on the central limit theorem, which asserts that the population of all possible samples of size n from a population with mean μ and variance σ² approaches a normal distribution:

$$f(x)=1/(\sigma\sqrt{2\pi})e^{\wedge}(-\!\!\int\!\! x-\mu\!\!\int\!\! ^\wedge 2/\!\!\int\!\! 2\sigma\!\!\int\!\! ^\wedge 2), X\sim N(\mu,\sigma^2) \quad \text{(Equation 17)}$$

An exponential distribution is a family of distributions that describe the time intervals between events that occur continuously and independently of one another at a constant average rate λ:

$$p(x)=\lambda e^{-\lambda x} \text{ for } x\geq 0 \quad \text{(Equation 18)}$$

Machine learning algorithm 226 can be any suitable algorithm depending on the target objective, such as the machine learning algorithms discussed with respect to machine learning modeler 120 of FIG. 1 (e.g., parameter estimation, clustering, PCA, k-nearest neighbor, boosting, statistical methods, neural networks, random forests, SVMs, etc.). The output of machine learning algorithm can be machine learning model 228.

After completion of modeling phase 202, the system can process new item listings in evaluation phase 250 beginning with real-time input stage 252. At this stage, a user may begin to create new item listing 254 by providing attribute values 258 for attributes 256. As indicated by the dashed lines, the user has not completed creating new item listing 254 and may continue editing it by modifying attributes 256 with different attribute values 258. However, when the system receives at least one attribute value, evaluation phase 250 can proceed to feature extraction stage 260 to generate feature vectors 262 from features 264 having feature values 266. Feature extraction stage 260 may use the same or similar underlying techniques as feature extraction stage 210.

Evaluation stage 270 can commence upon the system transmitting feature vectors 262 as input to machine learning model 228. During evaluation stage 270, the system can apply feature vectors 262 to machine learning model 228 to generate first evaluation 272, which can be a cluster, label, classification, or other output data computed by inputting feature values 266 actually entered by the user into machine learning model 228. The system can also generate one or more additional evaluations 274 by substituting at least one feature value 266 from feature vector 262 to identify the cluster, label, classification, or other output data determined by machine learning model 228. For example, a target objective for a new listing may be to maximize the number of impressions for the listing. The system can compute a predicted number of impressions by applying feature vector 262 to machine learning model 228 to obtain first evaluation 272. Then, the system can run a number of evaluations by substituting one or more feature values 266 of feature vector 262 with feature values from previous listings to obtain additional evaluations 274. In some embodiments, the user can select both features 264 and feature values 266 for substitution. In other embodiments, the system can select features 264 and feature values 266 for substitution, such as by using parameter estimation machine learning methods like Bayesian estimation, maximum a posteriori estimation, maximum likelihood estimation, and other parameter estimation methods discussed in the present disclosure. In still other embodiments, permutations of these approaches may be used, such as the user selecting some features and feature values for substitution (e.g., not necessarily one-to-one), and the system can select the remaining features and feature values.

First evaluation 272 and additional evaluations 274 can undergo delta analysis 276 to determine differences (e.g., measures of similarity or distance), if any, between a new item listing having all user-input values and other item listings substituting one or more user-input values with values from previous item listings. If the listings including substituted input values represent an improvement over the new item listing with respect to the target objective, the system can suggest replacing a user-input value with the substituted value. In some embodiments, delta analysis 276 can also include presentation of quantitative differences between the new item listing with all user-input values and item listings substituting one or more of the user-input values.

FIG. 3A-3I show examples of graphical user interfaces 300A, 300B, . . . , 300I (collectively, 300) for a content management system. In these examples, web browser 302 can be a desktop application (e.g., Microsoft Internet Explorer®) that presents graphical user interfaces 300. Other embodiments may utilize web browsers for other desktop computers (e.g., Google Chrome®, Mozilla Firefox®, etc.) or mobile devices (e.g., Chrome® for Google Android®, Safari® for Apple iOS®, etc.), native applications for desktop computers (e.g., TurboLister® from eBay®, Inc.) or mobile devices (e.g., eBay® mobile app for Google Android®, Apple iOS®, etc.), or other software executing on client devices for presenting graphical user interfaces. Still other embodiments may utilize interfaces that have no graphical elements (e.g., voice interfaces) or machine-to-machine interfaces (e.g., representational state transfer (REST) application programming interfaces (APIs), Simple Object Access Protocol (SOAP), Service Oriented Architecture (SOA), microservices, other APIs, and other machine-to-machine interfaces).

Figure 3A:
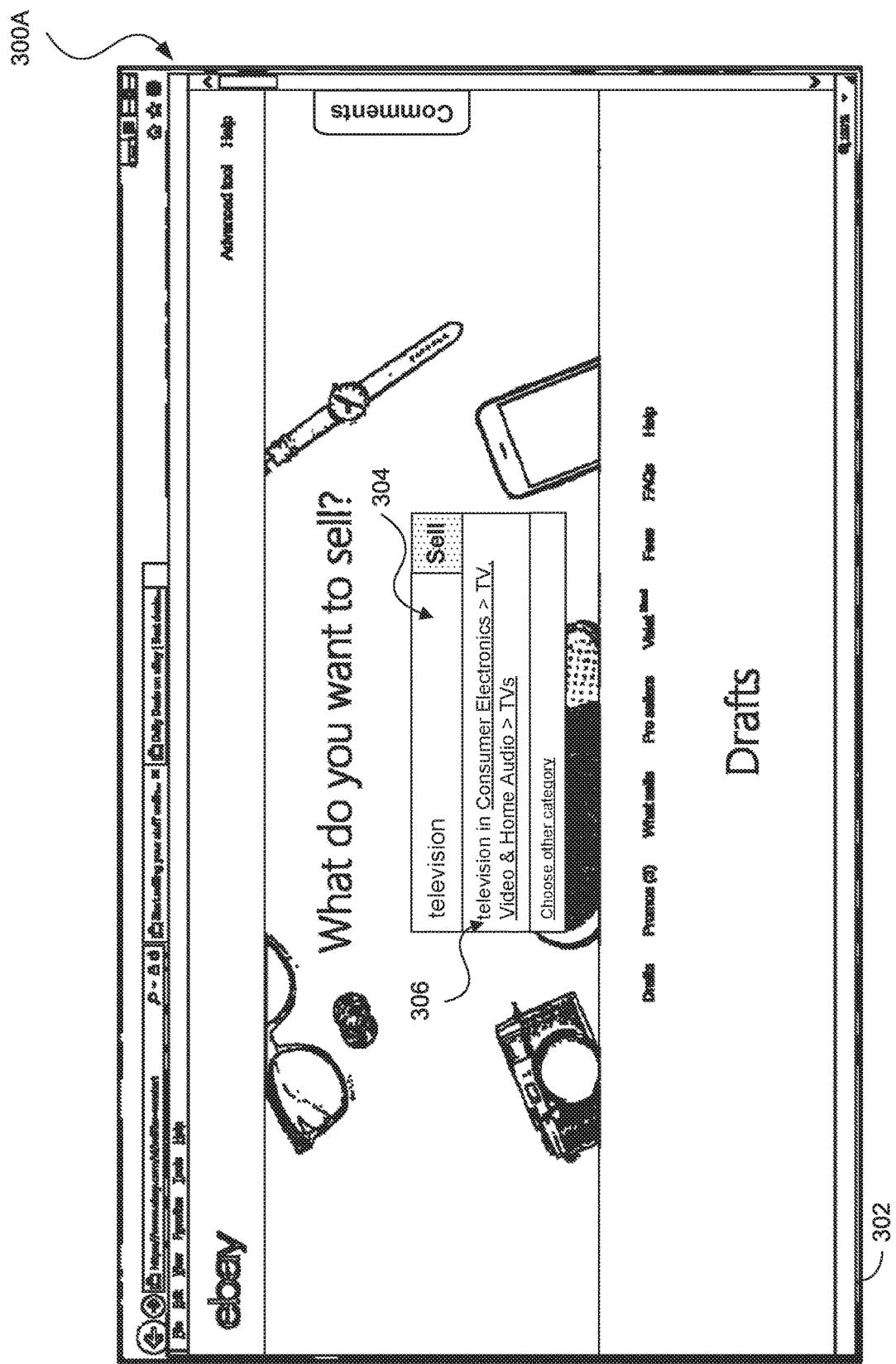
FIGS. 3A-3I illustrate examples of graphical user interfaces for visualizing evaluations performed by dynamically generated machine learning models in accordance with an embodiment.

FIG. 3A illustrates an example of an introductory user interface or landing page, graphical user interface 300A, for a content management system/online marketplace that a user (not shown) may navigate to over a wide area network (WAN) (e.g., the Internet) (not shown) by operating web browser 302. Graphical user interface 300A includes text entry user interface element 304 for a user to enter one or more terms (e.g., "television") relating to a listing for an item the user is attempting to sell in the online marketplace. Entry of the term into text entry user interface element 304 may trigger the display of user interface selection element 306, such as a context menu, drop-down list, or similar user interface element. In this example, user interface selection element 306 can display a set of categories to which the item listing may belong and enable selection of the category for an item listing. In some embodiments, the online marketplace can support selection and placement of the item listing in multiple categories.

In some embodiments, there can be distinct user interfaces following graphical user interface 300A that may depend on the selected category or categories for the item listing because of the differences between categories. These differences may be due to the relevance of item specifics for a category (e.g., the amount of disk storage may be a relevant item specific for an electronic device but not for an article of clothing while inseam may be a relevant item specific for the article of clothing but not the electronic device), time/date limitations (e.g., food items may have expiration dates, concert tickets may be limited by performance times and dates, etc.), or legal requirements (e.g., sales of real property may be subject to regulations that do not affect sales of personal property, some jurisdictions may promulgate laws for the sales of certain types of personal property, such as motor vehicles, boats, guns, etc.), among other differences.

After the user selects a category or multiple categories for the item listing, web browser 302 can take the user to one or more interstitial pages (e.g., user interfaces between an introductory user interface and the main user interface). In other embodiments, there may be no interstitial user interfaces, and selection of a category or multiple categories for an item listing can direct a user to the main user interface. In still other embodiments, there may be a single user interface that incorporates interfaces equivalent to the introductory user interface, any interstitial user interfaces, and the main user interface with each interface appended one after another as the user progresses through the application (e.g., by using a scroller user interface element, swiping a touchscreen forward vertically or horizontally, etc.).

Figure 3B:
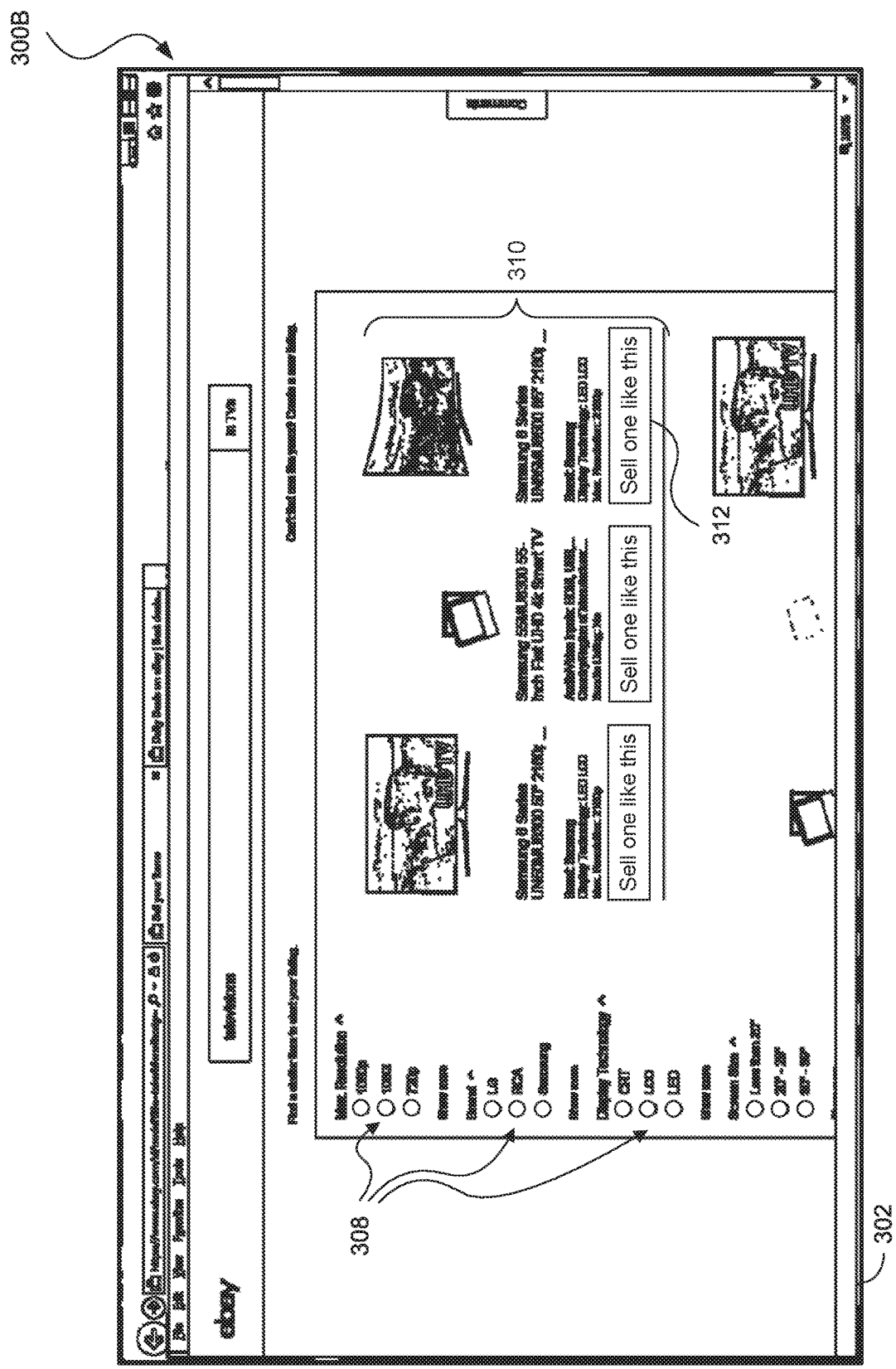

FIG. 3B shows an example of an interstitial page, graphical user interface 300B, that may be displayed between a landing page and a main page or user interface to provide additional details for an item listing. Graphical user interface 300B can include user interface selection elements 308 for specifying attributes associated with the item listing. In this example, the item attributes include maximum resolution, brand, display technology, screen size, color, and other features (e.g., Bluetooth support, Wi-Fi support, 3D support, etc.). In some embodiments, user interface selection elements 308 may operate as filters for eliminating specific item types that do not possess an item attribute selected by the user.

Graphical user interface 300B also includes item type identifier 310 for displaying information to help a user identify a specific type of item for which to generate an item listing. Item type identifier 310 may include an image for the specific item type, a title, a brief description, and user interface selection element 312 for selecting the specific item type for the item listing. In some embodiments, upon selection of a category or a specific item type for an item listing, the online marketplace can pre-load or pre-cache item into memory listings similar to the current item listing to enable real-time or near real-time machine learning modeling for the current item listing.

Figure 3C:
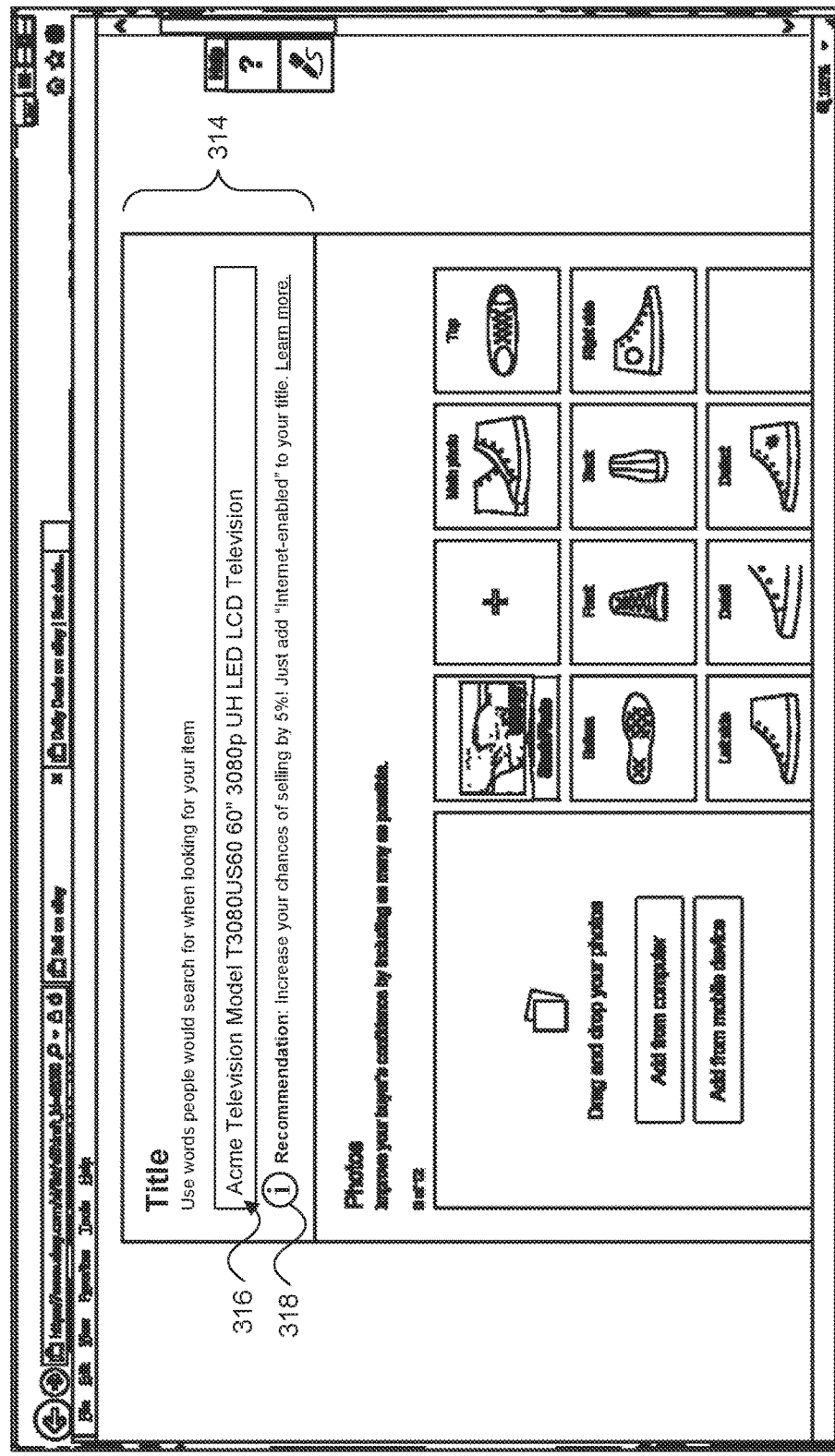
Figure 3D:
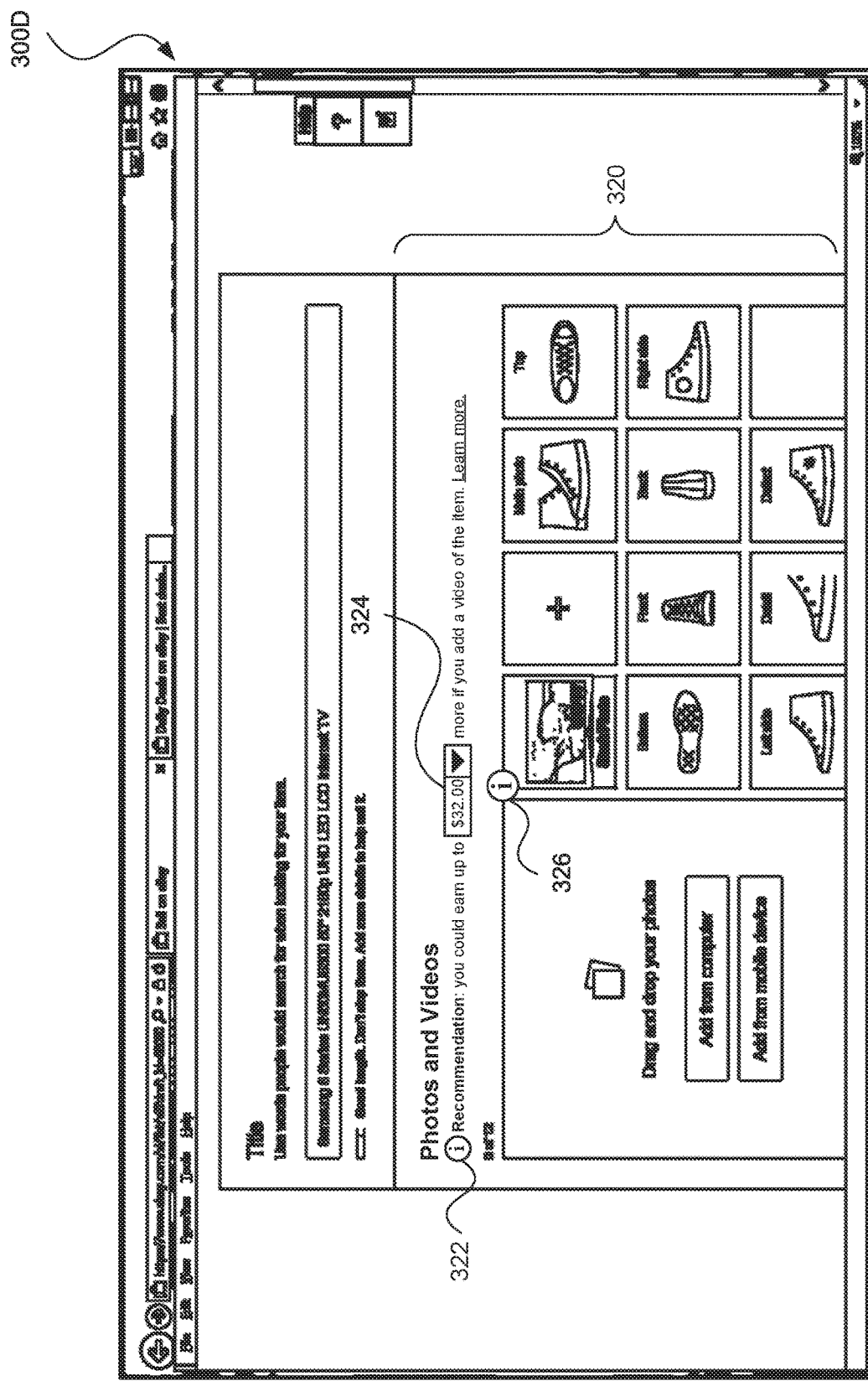

FIG. 3C shows an example of a portion of a graphical user interface, graphical user interface 300C, for a user to specify additional details for an item listing. In some embodiments, a network-based application may include each portion of the graphical user interfaces shown in FIGS. 3A-3I. Other embodiments can include additional, fewer, or alternative portions in similar or alternative arrangements within the scope of various embodiments unless otherwise stated. In addition, each portion may include the same number of elements, additional elements, fewer elements, or alternative elements in similar or alternative arrangements without departing from the scope of the present disclosure. In these examples, browser 302 displays the graphical user interfaces of FIGS. 3C-3I on a single page or view that a user can navigate using a scroll user interface element, a swiping gesture, or similar user interface element. In other embodiments, a client device can display a network-based service or application on multiple pages, views, windows, screens, frames, layouts, and the like.

In this example, graphical user interface 300C includes a user interface element, title section 314 (e.g., division or div, view, pane, tile, subframe, block, etc.) for editing a title of the item listing via text entry user interface element 316. Title section 314 also includes title recommendation 318, a user interface element that provides a recommendation on how the user may improve the title for the item listing (e.g., by adding the term "Internet-enabled") and a quantitative measure (e.g., 5%) associated with following through on the recommendation (e.g., increasing the probability of selling the item). In some embodiments, title recommendation 318 can display information received from a machine learning system for evaluating an item listing with respect to a target objective (e.g., maximizing selling price, maximizing selling probability, maximizing number of views of the item listing, etc.) from information input for the item listing, and information substituting user-inputted values. In some embodiments, title recommendation 338 can be dynamically updated as the user enters additional information for the new item listing.

3D shows an example of a portion of a graphical user interface, graphical user interface 300D, for editing photos and videos attributes for an item listing. Graphical user interface 300D includes a user interface element, photos and videos section 320, for adding, uploading, editing, deleting, and otherwise managing a set of photos, videos, or other image data for the item listing. Photo and video section 320 also includes photos and videos recommendation 322, a user interface element that offers suggestions to the user on how the user can change the set of photos or videos for the item listing (e.g., adding a video of the item) to achieve a target objective (e.g., maximizing a selling price for the item) and a quantitative measure that may be possible if the user follows the suggestion (e.g., increasing the estimated selling price by as much as $12.00). Similar to title recommendation 318 of FIG. 3C, photos and videos recommendation 322 may display information from a machine learning system capable of evaluating an item listing based on current inputs and evaluating the item listing by substitute one or more of the current inputs. In addition, photos and videos recommendation 322 can periodically update the information displayed to the user as she enters additional information for the item listing. In some embodiments, there may be multiple recommendations for editing a photo or video set, with each recommendation associated with a different quantitative measure and/or objective. In this example, browser 302 presents one recommendation for updating the photo or video set for the item listing and user interface selection element for 324 for selecting other recommendations. In other embodiments, browser 302 may present multiple recommendations at once. In still other embodiments, browser 302 may use one approach or the other depending on user preferences, past user behavior (e.g., of a specific user, a group of users sharing similar traits or behaviors, all users, etc.), the category or categories of the item listing, the size of the display screen of the client device, or other criteria.

In addition to user-defined views of items in photos and videos (e.g., front, back, top bottom, right, left, etc.), the online marketplace may also extract, as features for the item listing, the total number of photos or videos for the item listing, whether the photos or videos include stock photographs or stock video footage, respectively; the resolution of the photos or videos; whether the photos or videos are in encoded in color, grayscale, or another coloring scheme; whether the photos and videos are square, rectangular, circular, or other shape; whether the photos and videos are encoded in two dimensions (2D), 2.5 D (e.g., image data including objects that appear to have three dimensions but physically displayed on a 2D surface), 3D, or other dimensional formatting; or other image metadata (e.g., file name, image/video format, camera manufacturer and model, exposure time, luminance, chrominance, data format, etc.).

In some embodiments, the online marketplace may also be capable of evaluating the content of the photos and videos themselves using computer-vision (CV) techniques. For example, the online marketplace may process the photos and videos to extract lower-level image features, such as points, edges, or regions of interest. Point of interest or key points can include the intersections of edges, high variance points, local curvature discontinuities of Gabor wavelets, inflection points of curves, local extrema of wavelet transforms, Harris corners, Shi Tomasi points, or scale-invariant feature transform (SIFT) key points, among others.

Edges can mark the boundaries between regions of different colors, intensities, or textures. Some examples of edge-based features include Canny edges, Shen-Castan (ISEF) edges, Marr-Hildreth edges, Lindeberg edges, phase stretch transform (PST) edges, and random sample consensus (RANSAC) lines, among others.

In some embodiments, features of image data may define regions of interest. Techniques for identifying region-based features include segmentation, may include Laplacian of Gaussian blobs, Difference of Gaussian blobs, Hessian blobs, and maximally stable extremum regions (MSERs), among many others.

Figure 3E:
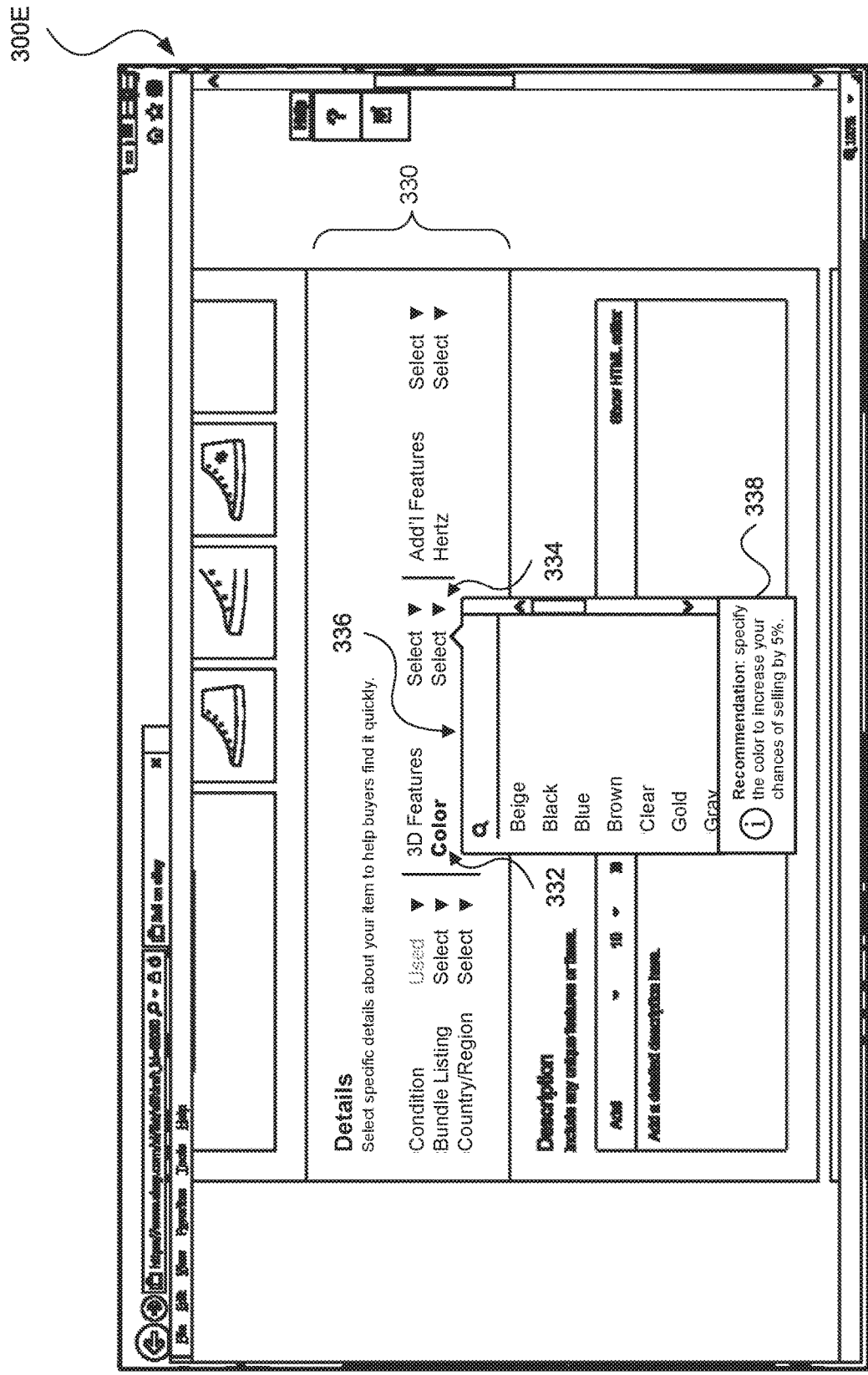

FIG. 3E shows an example of a portion of a graphical user interface, graphical user interface 300E, for editing various attributes for an item listing. In particular, graphical user interface 300E includes details section 330, which comprises several attributes of the listing that a user may select in order to specify additional details about an item pertaining to the listing, such as its condition (here, grayed out to indicate has previously populated this attribute), whether it is part of a bundle listing (e.g., sold as a package including other items), the country of origin, 3D features, additional features, and frequency.

In this example, browser 302 may display color label 332 differently from other attribute labels to indicate that the online marketplace has a recommendation regarding the color attribute for the item listing. When the user clicks on, taps, or otherwise selects user interface element 334, browser 302 may display context menu 336 to display the choices of the color of the item (e.g., beige, black, blue, etc.). Context menu 336 may also include widget 338 for recommending how a user may improve her listing (e.g., specifying the color of the item) and a quantitative measure associated with adopting the recommendation (e.g., an increase selling probability by 5%). Widget 338 may be another example of how an online marketplace can embed a widget into a user interface to help a user achieve a particular objective when generating an item listing.

Figure 3F:
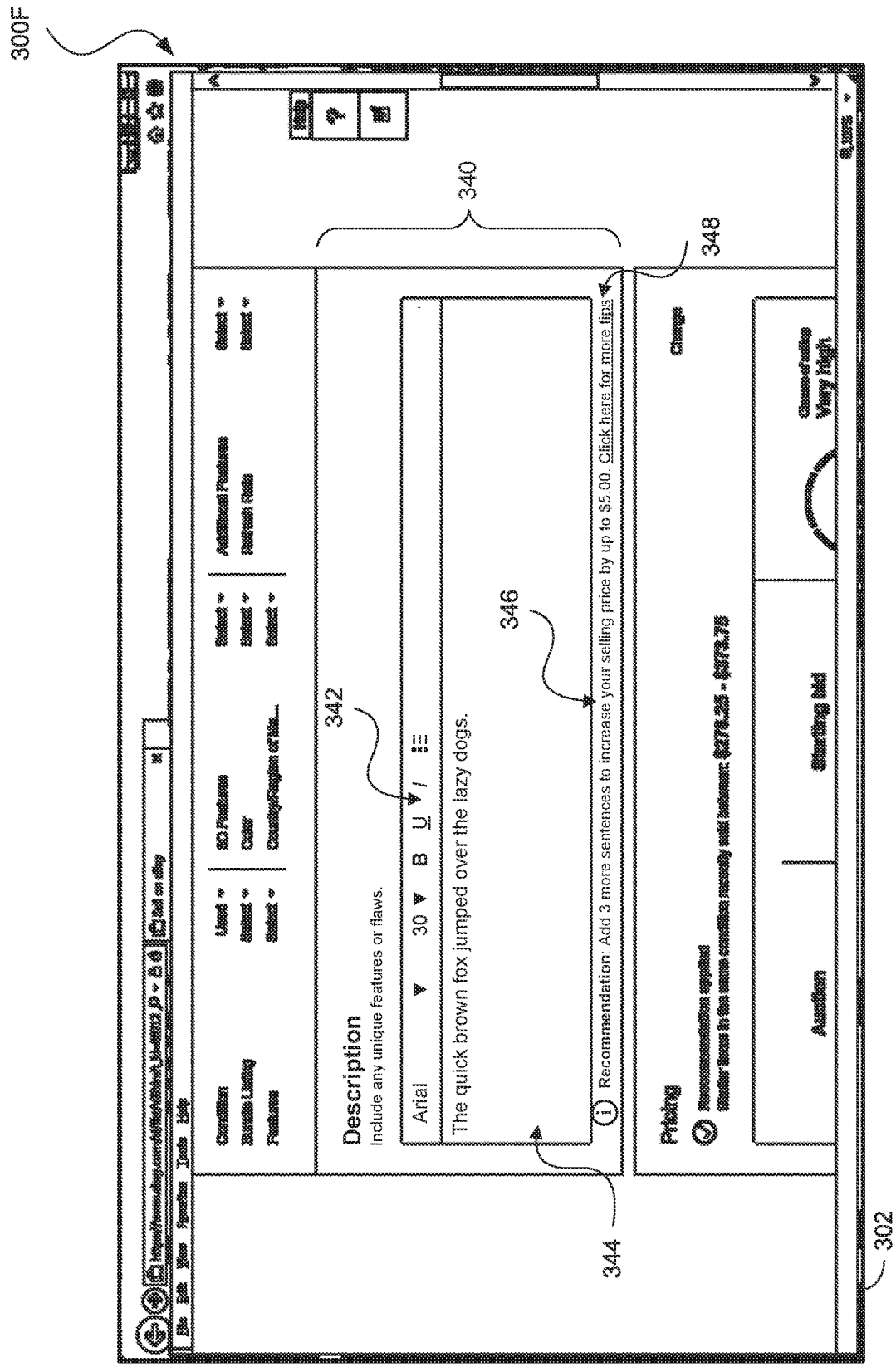

FIG. 3F shows an example of a portion of a graphical user interface, graphical user interface 300F, for editing a description of an item listing. Graphical user interface 300F includes description section 340, a what-you-see-is-what-you-get (WYSIWYG) user interface including formatting toolbar 342 for changing the font, font size, bolding, underlining, italicizing, and bulleting of a description entered by the user into text entry user interface element 344. Other embodiments may also enable the user to customize the arrangement of the attributes of the item listings, such as the photos and videos uploaded via photos and videos section 320 of FIG. 3D, attributes (e.g., the attributes corresponding to user interface selection elements 308 of FIG. 3B, the attributes of details section 330 of FIG. 3E, user attributes (e.g., the user's rating, the number of years the user has been a member of the online marketplace, the percentage of the feedback the user has received is positive, etc.). Still other embodiments may include other formatting elements (e.g., font color, background color or image, headings, etc.).

Description section 340 also includes widget 346 for providing the user with suggestions on how she may improve the description and link element 348 to review additional tips. In some embodiments, widget 346 (and any other widget discussed in the present disclosure) may operate in real-time or nearly real-time (e.g., at a rate exceeding a minimum latency threshold) to provide the user with continuous feedback on how to update the description and a quantitative measure associated with the update. In addition to quantitative features of the description (e.g., number of words, number of sentences, etc.), the online marketplace may also analyze other aspects of the description, such as with respect to a semantic or lexical domain (e.g., identifying whether the description includes certain keywords or discusses topics important to buyers), a syntactic domain (e.g., formatting, spelling errors, grammatical errors, whether the description includes a minimum number of headings, whether there is too much text formatting or too little formatting, etc.), an image domain (e.g., identifying the quality of photos or videos, icons or image-based characters, and other image data embedded in the description), an accuracy domain (e.g., identifying the accuracy of the description of the item based on product catalogs, and product history reports (e.g., vehicle history reports), etc.), among other domains discussed throughout the present disclosure.

Figure 3G:
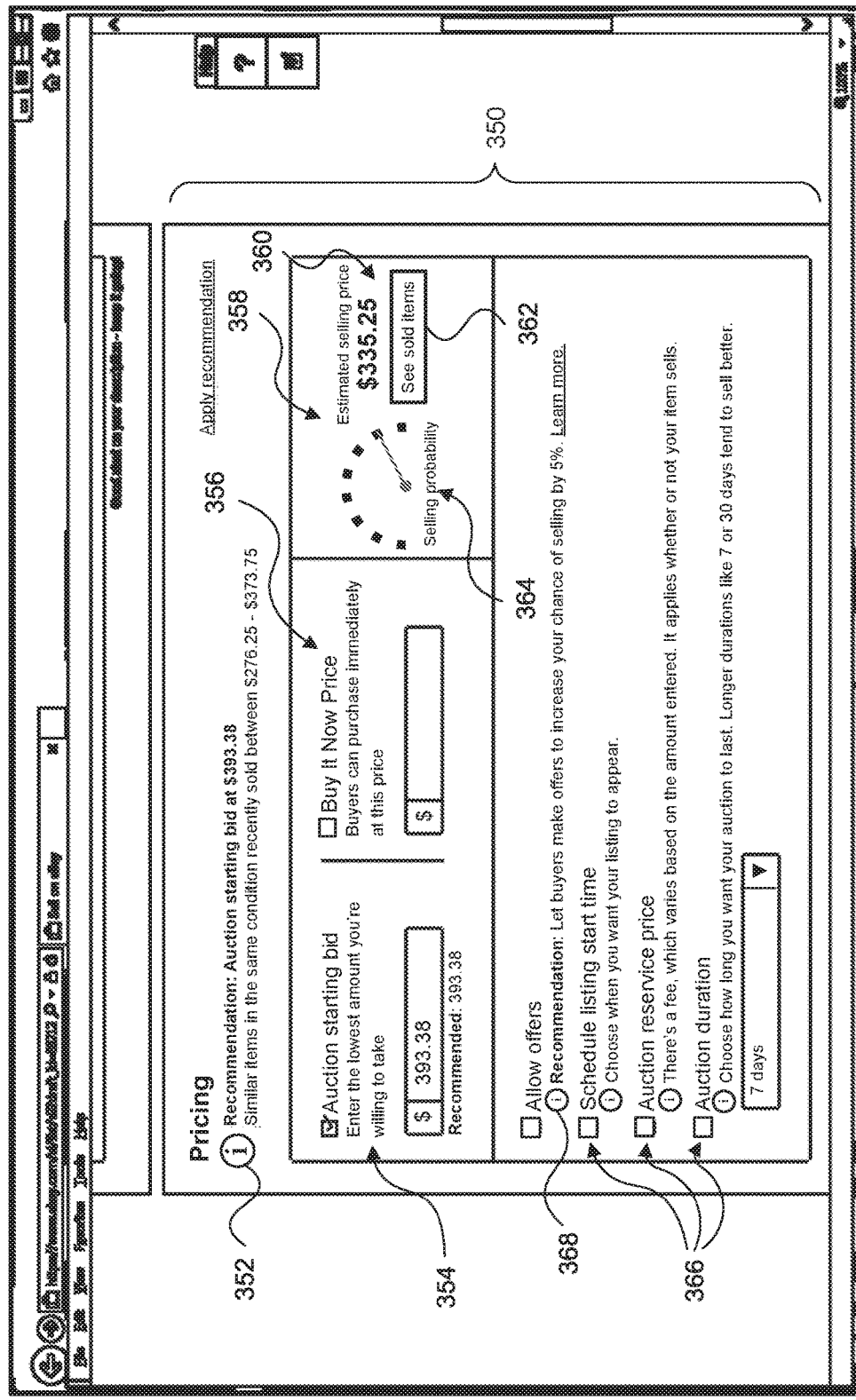

FIG. 3G shows an example of a portion of a graphical user interface, graphical user interface 300G, for configuring attributes for an item listing. Graphical user interface 300G may include pricing section 350 for setting pricing information for the item listing. At the top of pricing section 350, graphical user interface 300G can include widget 352, a user interface element for presenting an online marketplace's recommendation for a price to set for an item listing and a quantitative measure associated with the recommendation (e.g., a price range of similar items recently sold in the online marketplace). Pricing section 350 can include auction user interface element 354 for selecting whether to put the item up for sale in an online auction (e.g., via checkbox), a text input user interface element for entering the starting bid for the auction, and a widget displaying the online marketplace's suggested starting bid. In some embodiments, the appearance of the widget may change in real-time or near real-time depending on the price the user enters into the text input user interface element, such as a difference between the recommended price and the entered price (e.g., green if the entered price is greater than the recommended price, red if the entered price is greater, and vice versa) and a change in the selling probability based on the entered price (e.g., red if the selling probability of the entered price is less than the selling probability of the recommended price, green if the selling probability of the entered price is less than the selling probability of the recommended price, and vice versa).

Pricing section 350 also include "Buy It Now" user interface element 356 for offering the item up for sale at a fixed price (e.g., in combination with or in lieu of a starting bid for the item. In this example, Buy It now user interface element 356 may operate in a similar manner as auction user interface element 354. For example, But It Now user interface element 356 can include a checkbox for the user to place the item for sale at a fixed-price, a text input user interface element for entering the fixed-price, and a widget for recommending a fixed-price (not shown). In some embodiments, the widget may display different recommended prices depending on whether the user opts to put the item up for sale at a fixed-price in combination with putting it up for sale in an auction or putting the item for sale at a fixed-priced alone. Similarly, the selling probability can depend on whether the item is available for sale at both an auction and a fixed-price, at an auction alone, or at a fixed-price alone.

Pricing section 350 also includes widget 358, another example of a user interface element that an online marketplace can utilize to enable visualization of underlying machine learning processes. Widget 358 may include estimated selling price 360, a user interface element representing the online marketplace's predicted selling price for the item listing based on the values entered/selected by the user for the attributes of the item listing up to that moment. Widget 358 can also include user interface selection element 362. On selection of user interface selection element 362, web browser 302 may display a set of item listings for similar items recently sold within the online marketplace, such as within a context menu, pop-up window, new webpage, new window, or other suitable user interface.

For example, here, widget 358 includes graphical user interface element 364, a gauge representing the selling probability calculated by the same machine learning system that calculated estimated sales of price 360. In other embodiments, the online marketplace may display predictions from multiple machine learning processes directed to different user objectives (e.g., maximum selling probability or selling price estimate). Users may select one or more objectives, or the online marketplace can select the objectives for the users.

Pricing section 350 can also include additional user interface elements 366 for setting other pricing attributes of the item listing, such as whether the user will accept buyer offers, a scheduled time of publication, an auction reserve price (e.g., a minimum amount by which a winning bidder must bid in order to purchase the item), a length of duration, and the like. In this example, each additional user interface element 366 may include widget 368.

Figure 3H:
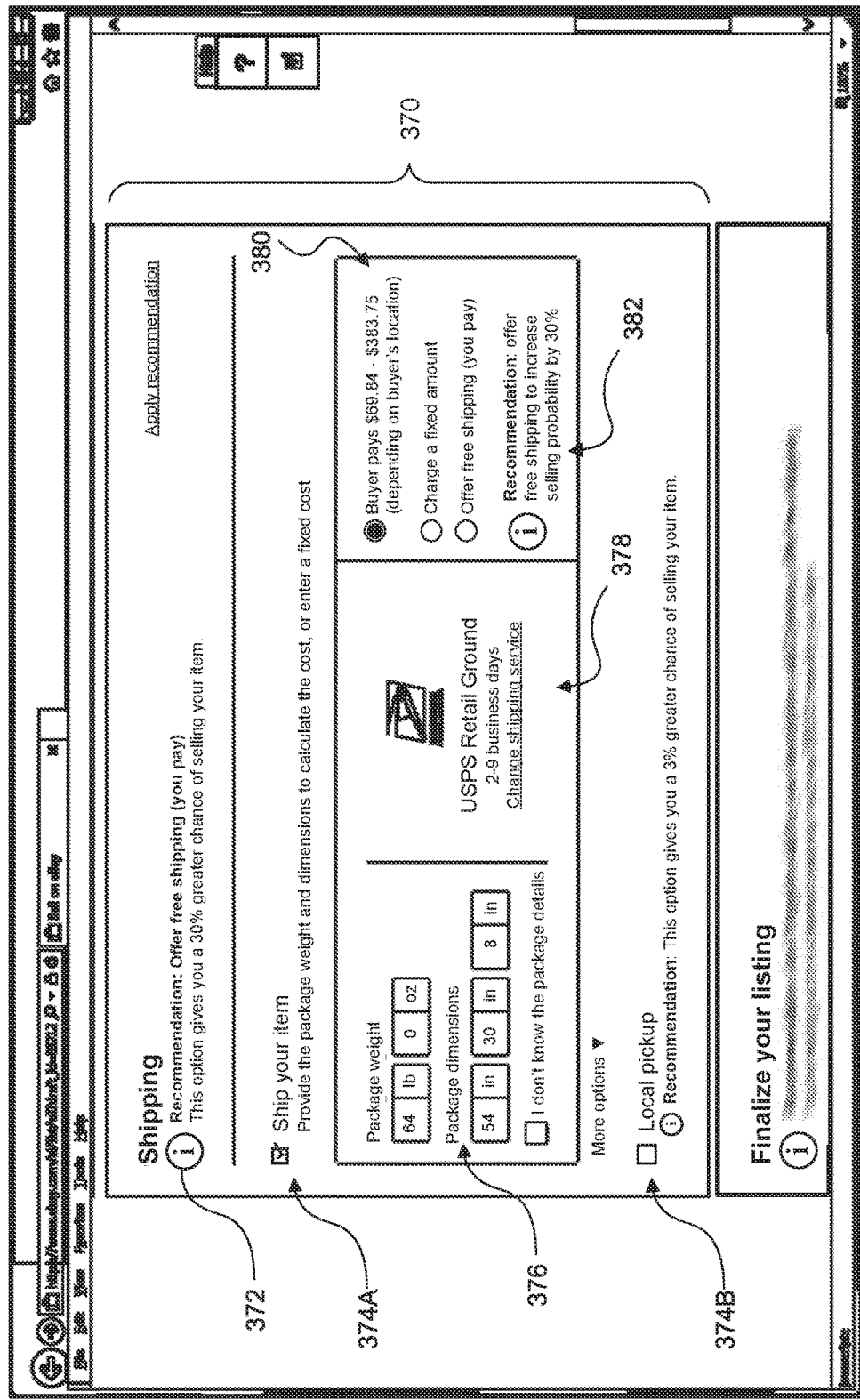

FIG. 3H shows an example of a portion of a graphical user interface, graphical user interface 300H, that includes shipping section 370 for enabling a user to edit shipping options for an item listing. In this example, shipping section 370 includes widget 372 for providing a recommendation derived from a machine learning process to achieve a particular objective. Shipping section 370 may also include user interface selection elements 374A and 374B for selecting whether to ship the item and/or provide for local pick-up of the item. In this example, user interface selection element 374B includes a widget providing an additional recommendation for the item listing (e.g., selecting the option for local pick-up) and a quantitative measure of effecting the recommendation (e.g., increase selling probability by 2%).

Shipping section 370 may include various other user interface elements for specifying additional shipping information for the item listing, such as text input user interface elements 376 for entering the dimensions of the shipping package and user interface selection element 378 for selecting a carrier for delivering the shipping package. In this example, shipping section 370 also includes user interface selection element 380 for selecting a shipping payment option, such as whether to charge a buyer a variable amount depending on the shipping address, charge a fixed amount, or offer free shipping. Here, user interface selection element 380 also includes widget 382 recommending the user to offer free shipping to increase the selling probability by as much as 30%.

Figure 3I:
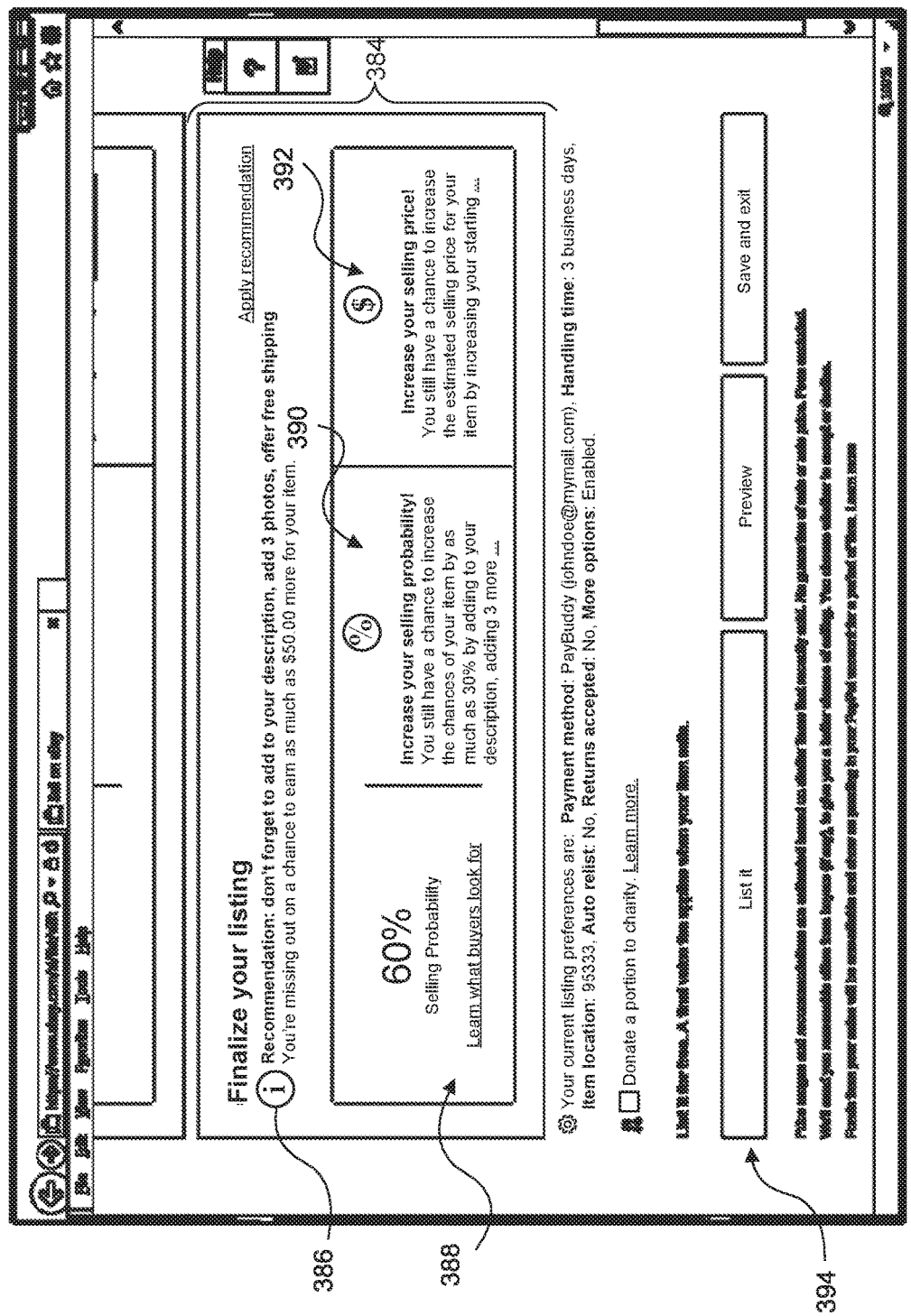

FIG. 3I shows an example of a portion of a graphical user interface, graphical user interface 300I, including finalization section 384 for finalizing creation of an item listing. Finalization section 384 includes widget 386, which provides multiple suggestions for maximizing a selling price for the new item listing and a predicted amount for the selling price if the user chooses to follow the suggestions. Finalization section 384 also includes user interface element 388 indicating the final selling probability for the new item listing determined based on the currently entered attribute values, user interface element 390 providing suggestions for how the user may maximize the selling the probability of the new item listing, and user interface element 392 providing suggestions how the user can maximize the selling price for the new item listing. In this example, user interface elements 390 and 392 may also operate as user interface selection elements that, when selected by a user, automatically performs the actions recommended in the suggestions. For example, selection of user interface element 392 can increase the starting selling price to a suggested amount. This action can also change the selling probability and the suggestion provided by user interface element 390. Finally, graphical user interface 300I also includes user interface submission element 394 for submitting the new item listing that, when selected by the user and processed by the system, publishes the new item listing.

Figure 4A:
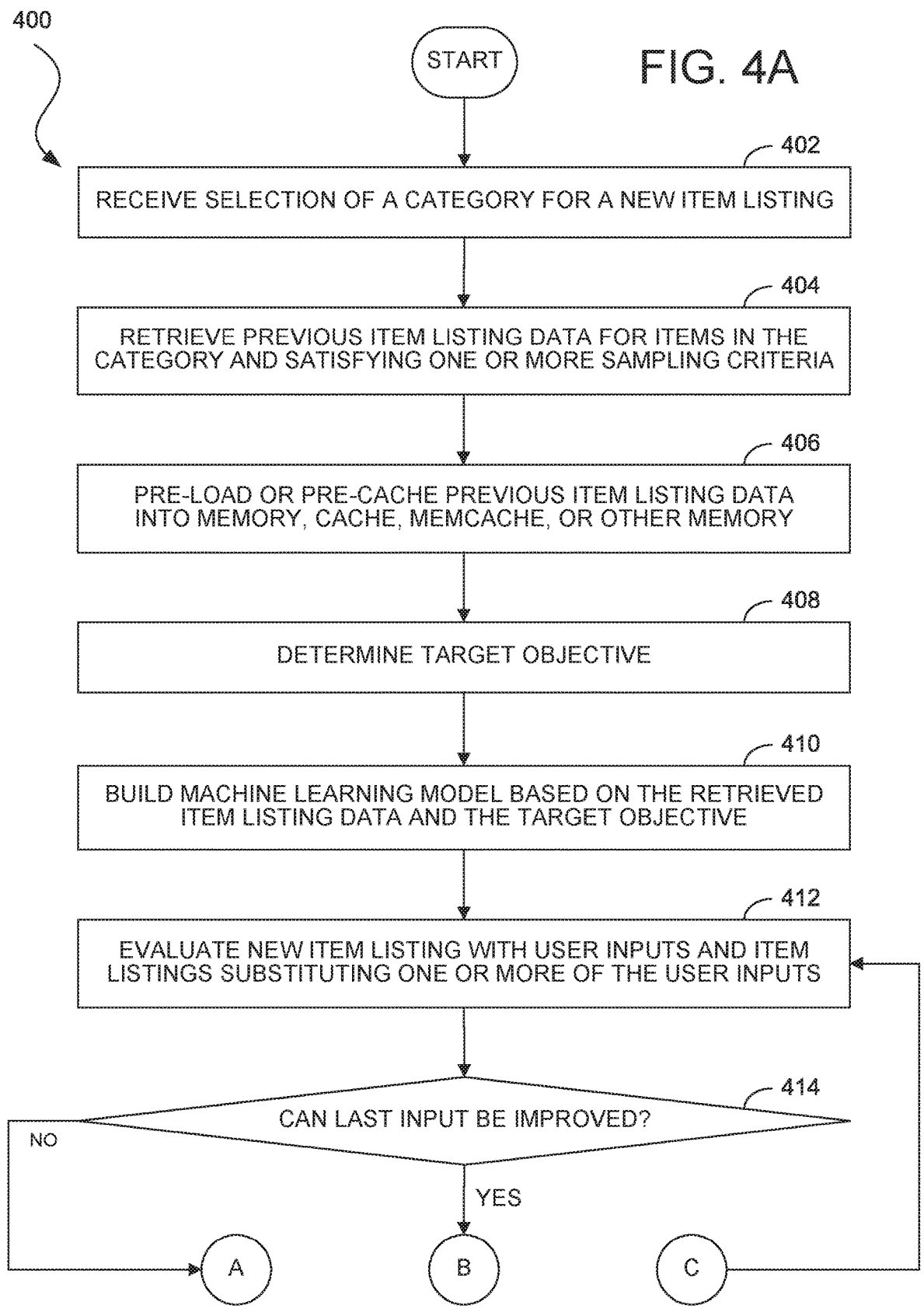
FIGS. 4A and 4B illustrate an example of a process for dynamic generation of a machine learning model and user interfaces for visualization of evaluations of the model in accordance with an embodiment.
Figure 4B:
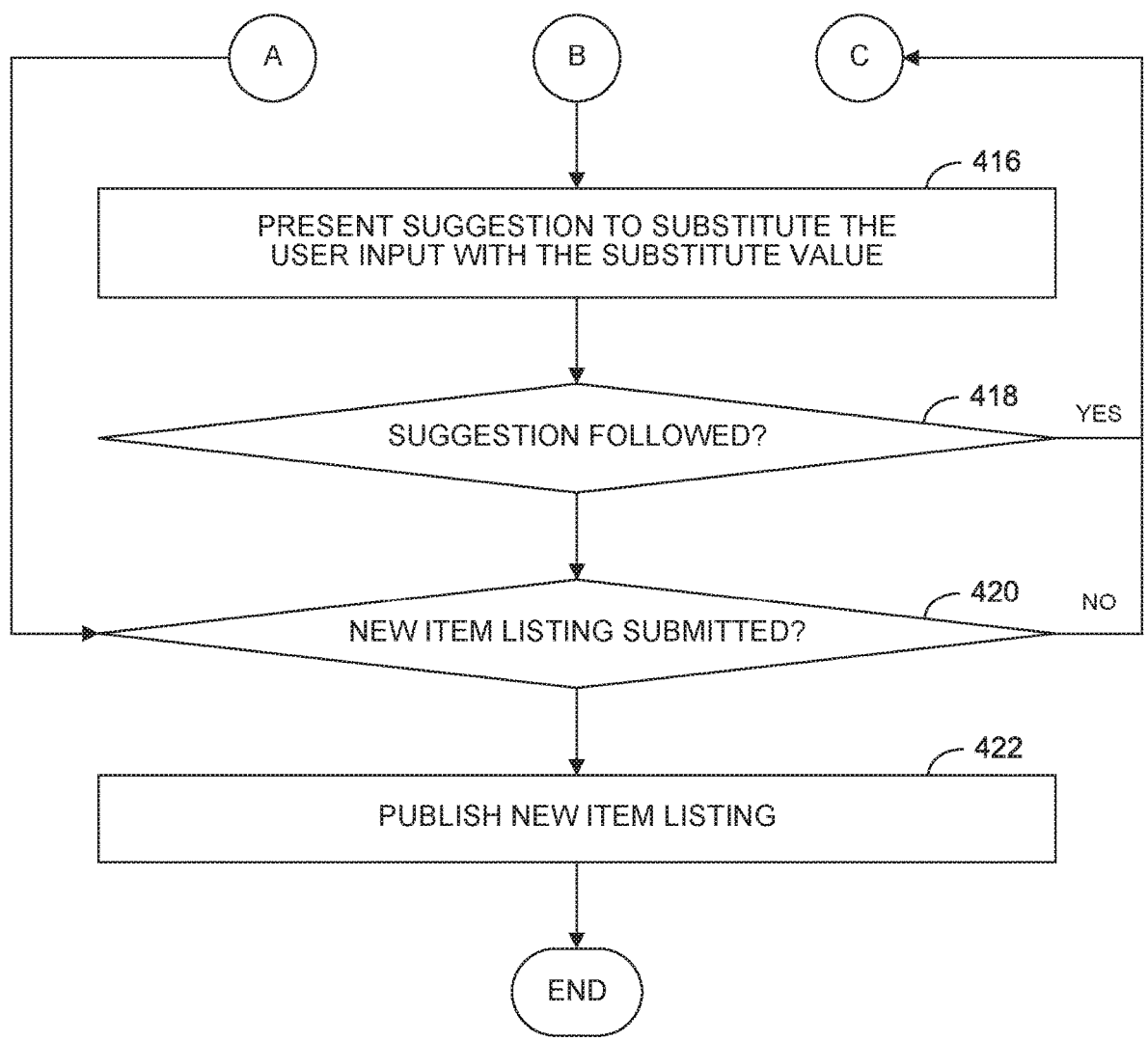

FIGS. 4A and 4B show an example of a process, process 400, for generating a machine learning model for achieving a target objective, presenting evaluations of the model under multiple scenarios, and suggesting user inputs for achieving outcomes from certain evaluations. For illustrative purposes, a computing system for providing online marketplace functionality can perform process 400 but one of ordinary skill in the art will appreciate that other embodiments may utilize other types of network-based services and applications to perform process 400. In addition, there can be additional, fewer, or alternative steps performed or stages that occur in similar or alternative orders, or in parallel, within the scope of various embodiments unless otherwise stated.

Process 400 may begin at step 402 in which the computing system may receive a selection of a category or multiple categories for a new item listing from a client device associated with a user having a user account with the computing system. The client device can be a server, desktop computer, mobile phone/smart phone, tablet, ultra-book, netbook, laptop, multi-processor system, microprocessor-based or programmable consumer electronic device, game console, set-top box, or other electronic device capable of communicating with other electronic devices over a wide area network.

Selection of the category or categories can trigger retrieval of previous item listings related to the new item listing, such as previous item listings in the same category or categories as the new item listing. In addition, the user or the system can specify additional criteria for selecting previous item listings that will form the sampling data for machine learning modeling, such as a minimum or maximum number of previous item listings, a time period associated with the previous item listings, a selling state of a previous item listing (e.g., sold or unsold), a selling price (e.g., final selling price of a sold item, a minimum bid price for an auctioned item, an asking price for an unsold buy-it-now item, etc.) of the item listing, or other conditions associated with the attributes of item listings discussed throughout the present disclosure.

Process 400 can proceed to step 406 in which the system can pre-load or pre-cache previous item listings into memory, cache, memcache, and the like. In some embodiments, the computing system may utilize an Apache Spark™ framework for in-memory processing of the previous item listing data. Spark™ is an in-memory cluster computing framework for processing and analyzing large datasets and a wide range of workloads (e.g., batch, iterative, interactive, streaming, etc.). The Spark™ framework comprises Spark™ Core, Spark™ SQL, Spark™ Streaming, MLib, and GraphX.

Spark™ Core provides the basic functionality of the Spark™ processing framework, and includes components for task scheduling, memory management, fault recovery, and interacting with storage systems, among others. Spark™ Core also includes the API for the Spark™ framework's basic building blocks, resilient distributed datasets (RDDs). RDDs represent a collection of items distributed across many compute nodes that can be operated upon in parallel. Spark™ Core provides the functions for operating on these collections.

Spark™ SQL is a component of the Spark™ framework that allows for querying of data persisted in a variety of types of data stores (e.g., key-value stores, graph databases, column-family databases, etc.) using SQL or variants (e.g., Apache Hive™ Query Language (HQL)). Spark™ SQL also supports integration of SQL and SQL-like queries with operations on RDDs using programmatic languages (e.g., Python™, Oracle Java®, Scala, etc.).

Spark™ Streaming is a component of the Spark™ framework for processing data streams. Spark™ Streaming provides an API for operating on data streams that closely matches Spark™ Core's API for operating on RDDs, making it easier to move between applications that manipulate data stored in memory, on disk, or arriving in real time.

MLlib is a machine learning library, and provides functionality for classification, regression, clustering, and collaborative filtering, as well as supporting functionality such as model evaluation and data import. MLlib also exposes some lower-level ML primitives, such as generic gradient descent optimization.

GraphX is a library for operating on graphs and performing graph computations in parallel. GraphX also provides functions for operating on portions of a graph (e.g., vertices, edges, subgraphs) and common graph algorithms (e.g., PageRank, triangle counting, etc.).

A Spark™ application generally includes a driver program, a cluster manager, workers, executors, and tasks. The driver program operates as a library to provide the data processing code executed by the workers. The cluster manager acquires resources for executing the application. The cluster manager (e.g., standalone, Apache Mesos®, Yet Another Resource Negotiator (YARN), etc.) can coordinate computing resources across a cluster, provide low-level scheduling of cluster resources across applications, and enable multiple applications to share cluster resources and run on the same workers. The workers can provide CPU, memory, and storage resources to the application and run the application as distributed processes on a cluster. The executors are virtual machines (e.g., Java® virtual machine (JVM)) created on each worker) that can execute code concurrently in multiple threads, and that can also cache data in memory or disk. A task is the smallest unit of work the application sends to an executor, which is executed by a thread in the executor. Each task can comprise a set of computations to either return a result to the driver program or partition its output for shuffle. The Spark™ application creates a task per data partition. As executors can run one or more tasks concurrently, the amount of parallelism may be determined by the number of partitions. More partitions can mean more tasks processing data in parallel.

At step 408, the computing system can determine a target objective for machine learning modeling, evaluation, and visualization. Some examples of objectives include sales goals (e.g., selling an item for a particular price, selling the item with a particular degree of certainty, selling the item by a particular date, selling the item to incur a particular amount of fees), impression goals (e.g., receiving a particular number of impressions for an item listing), and other types of goals (e.g., building up a user account rating). In some embodiments, the target objective may be user-specified (e.g., specified by a specific user or a set of users sharing common characteristics or behaviors). In other embodiments, the system may specify the target objective. In still other embodiments, the computing system can take both user preferences and system preferences into consideration for determining the target objective.

Process 400 may continue onto step 410 in which the computing system can generate a machine learning model from the retrieved item listing data and target objective. In some embodiments, the computing system may use the same or a similar process as modeling phase 202 of FIG. 2. For example, the computing system can receive attribute values for attributes of previous item listings, extract feature values and features from the attributes and attribute values, and build a feature vector for each previous item listing using the extracted features and feature values. The system can apply the feature vectors and target objective to a machine learning algorithm to generate the machine learning model. In some embodiments, the system can also utilize distribution data (e.g., a binomial distribution, Poisson distribution, uniform distribution, normal distribution, exponential distribution, etc.) for ensuring the sampling data conforms to a particular distribution.

A suitable machine learning algorithm used for generating the machine learning model may largely depend on the target objective, and one of ordinary skill in the art is capable of selecting an appropriate machine learner given an objective. For illustrative purposes, in one embodiment, the target objective may relate to maximizing selling probability. A system can create bins each representing a range within 10% and 80% selling probability (e.g., 4 bins of 20%, 40, 600, and 80%, 8 bins of 10%, 20%, . . . , 80%, 80 bins of 20%, 21%, 22%, . . . , 80%, etc.). The system can apply an unsupervised machine learning algorithm (e.g., k-means clustering, hierarchical clustering, density-based clustering, grid-based clustering, PCA, EM, etc.) or classification algorithm (e.g., KNN, boosting, perceptrons/neural networks, decision trees/random forests, SVMs, etc.) to generate a machine learning model that clusters or classifies the previous item listings among the bins that best fits a given distribution curve (e.g., binomial distribution, Poisson distribution, uniform distribution, normal distribution, exponential distribution, etc.).

In other embodiments, the system may utilize parameter estimation (e.g., Bayesian estimation, MMSE, MAP estimation, MLE, SSD estimation, robust estimation, regression, etc.) for generating the machine learning model. For example, the system can parameterize the attributes of item listings and identify the parameters/attributes that minimize the probability that a new item listing does not sell or that maximize the selling probability of the new item listing. The system can report the selling probability in a number of ways, such as the inverse of the minimum probability that the new item listing does not sell, the maximum selling probability, or a confidence level associated with a predicted minimum probability that the new item listing does not sell or a predicted maximum selling probability.

As the system builds the machine learning model, the system can concurrently receive additional attribute values for the attributes of the new item listing (e.g., title, description, photos/videos, item specifics, etc.). When the system completes constructing the machine learning model and the user has inputted at least one additional attribute value, the system can perform a number of evaluations using the model at step 412. These evaluations can include the system applying all of the attribute values to the model to identify an outcome relative to the target objective, applying one substituted attribute value and all remaining attribute values entered by the user to identify another outcome relative to the target objective, applying multiple substituted attributed values and at least one attribute value entered by the user to identify another outcome relative to the target objective, and/or applying all substituted attribute values to identify another outcome relative to the target objective.

At step 414, the system can determine whether any outcomes including a substituted attribute value improves upon the outcome associated with only the attribute values entered by the user. In some embodiments, this evaluation may be based on any improvement. In other embodiments, the improvement must exceed a minimum threshold (e.g., increase maximum selling price by at least $5.00, increase selling probability by at least 3%, etc.) to constitute an improvement. Alternatively or in addition, the improvement must exceed a minimum confidence level (e.g., more than 50%) for consideration as an improvement. If no outcome including a substituted attribute value improves upon the outcome associated with only the attribute values entered by the user, then process 400 may proceed to conditional step 420.

If an outcome including a substituted value represents an improvement upon the outcome including only attribute values entered by the user, then the system may present a suggestion to substitute the user-entered attribute value with the substitute value at step 416. In some embodiments, the system may run multiple evaluations of outcomes with substituted values, including different attribute values for a single attribute (e.g., $V_1$ for $A_1$ and $V_2$ for $A_1$) or different combinations of substituted values for multiple attributes (e.g., $V_1$ for $A_1$, $V_2$ for $A_2$. $V_3$ for $A_3$ and $V_4$ for $A_1$, $V_2$ for $A_2$, $V_3$ for $A_3$). The system may select the outcome that represents a maximum improvement or a maximum improvement exceeding a minimum improvement threshold and/or minimum confidence threshold for generating the suggestion to the user.

Process 400 can continue to conditional step 418, in which the system determines whether the user has followed the suggestion provided at step 416 and substituted a user-entered attribute value with an attribute value recommended by the system. If so, process 400 can return to step 412 and re-evaluate the new item listing and perform one or more other evaluations substituting one or more other user-entered attribute values. If not, process 400 can continue onto conditional step 420 in which the system checks for submission of the new item listing. If the user has submitted the new item listing, the system can publish the new item listing item at step 422 and process 400 can come to a completion. If not, process 400 can return to step 412 and evaluate other combinations of substituted attribute values for the new item listing.

Figure 5:
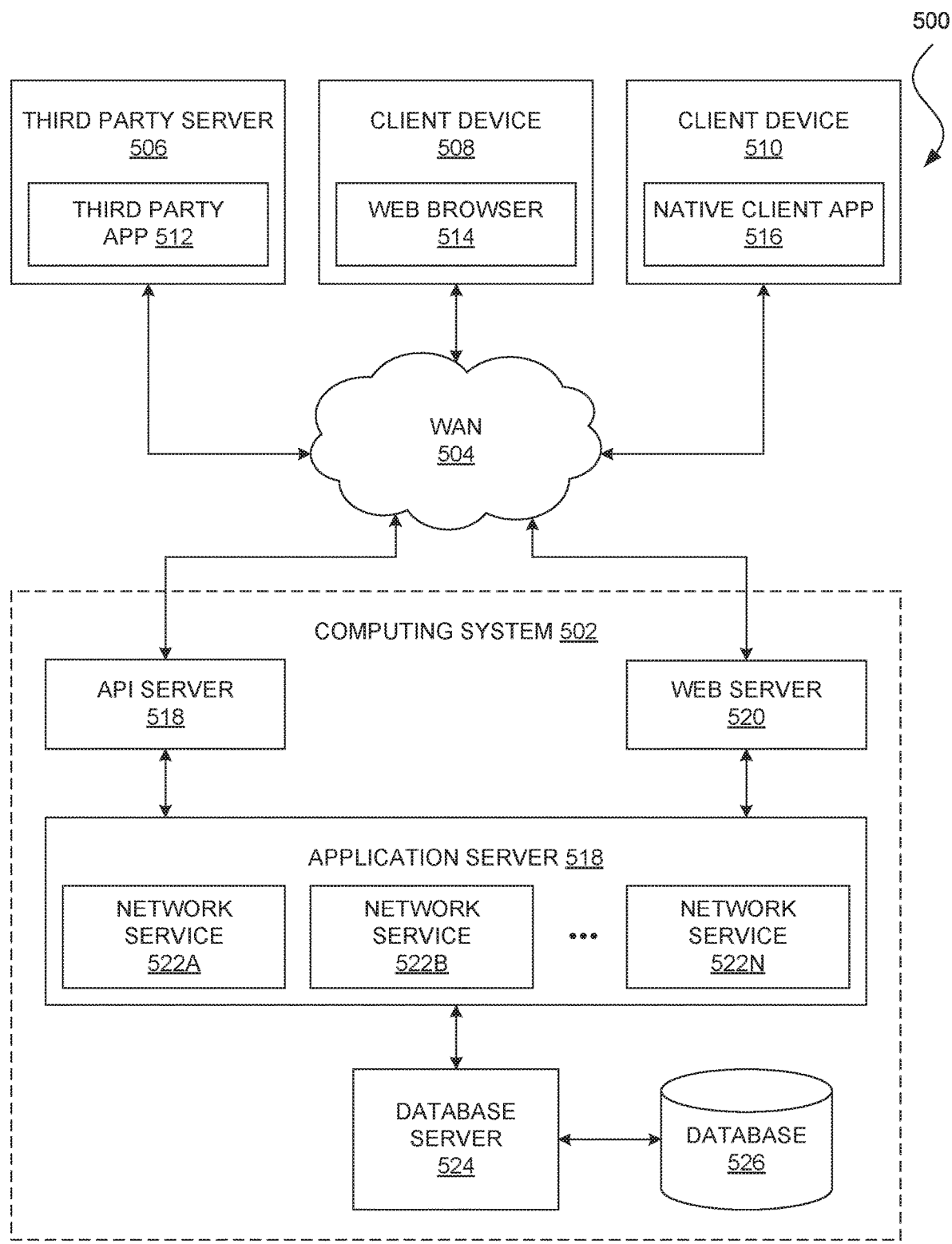
FIG. 5 illustrates an example of a network environment in accordance with an embodiment.

FIG. 5 shows an example of a network architecture, network architecture 500, in which various embodiments of the present disclosure may be deployed. In this example, network architecture 500 includes network-based service or application 502, wide area network (WAN) 504 (e.g., the Internet), third-party server 506, client device 508, and client device 510. Network-based service or application 502 can provide online marketplace functionality to third-party server 506, client device 508, and client device 510 over WAN 504. Users (e.g., buyers, sellers, advertisers, etc.) may interact with network-based service or application 502 using third-party application 512 (e.g., applications incorporating the eBay® API), web browser 514 (e.g., Microsoft Internet Explorer®, Google Chrome®, Mozilla Firefox®, Apple Safari®, etc.), or native application 516 (e.g., eBay® mobile app for Google Android®, Apple iOS®, etc.) executing on third-party server 506, client device 508, and client device 510, respectively. Although each of third-party server 506, client device 508, and client device 510 are shown executing one application to interact with network-based service or application 502, each may include third-party application 512, web browser 514, native application 516, or some combination of these applications.

Some examples of client devices 508 and 510 include servers, desktop computers, mobile phones, smart phones, tablets, ultra-books, netbooks, laptops, multi-processor systems, microprocessor-based or programmable consumer electronics, game consoles, set-top boxes, or any other communication device that a user may utilize to access network-based service or application 502. An example of an implementation of client device 508 and/or 510 is discussed further below with respect to FIG. 8.

Application program interface (API) server 518 and web server 520 may be coupled to, and provide programmatic and web interfaces respectively to, application server 518. Application server 518 may host network services 522A, 522B, . . . , 522N (collectively, 522), each of which may comprise one or more modules or applications embodied as hardware, software, firmware, or any combination thereof. Application server 518 may connect to database server 524 to access information storage repository or database 526. In some embodiments, database 526 is a storage device that stores information to be posted (e.g., publications or listings, images of products, etc.) to network services 522. Database 526 may also store digital goods information in accordance with various embodiments.

Web browser 514 can access various network services 522 via a web interface supported by web server 520. Similarly, native client application 516 can access the various services and functions provided by network-based service or application 502 via the programmatic interface provided by API server 518. In some embodiments, native client application 516 may be a seller application (e.g., the Turbo Lister desktop application developed by eBay® Inc.) to enable sellers to author and manage listings within network-based service or application 502 in an off-line manner, and to perform batch-mode communications between native client application 516 and network-based service or application 502.

Additionally, third-party application 512, executing on a third-party server 506, may have programmatic access to network-based service or application 502 via the programmatic interface provided by API server 518. For example, third-party application 512, utilizing information retrieved from network-based service or application 502, may support one or more features or functions on a website hosted by the third-party. The third-party website may provide one or more promotional, marketplace, or payment functions that are supported by network-based service or application 502.

Figure 6:
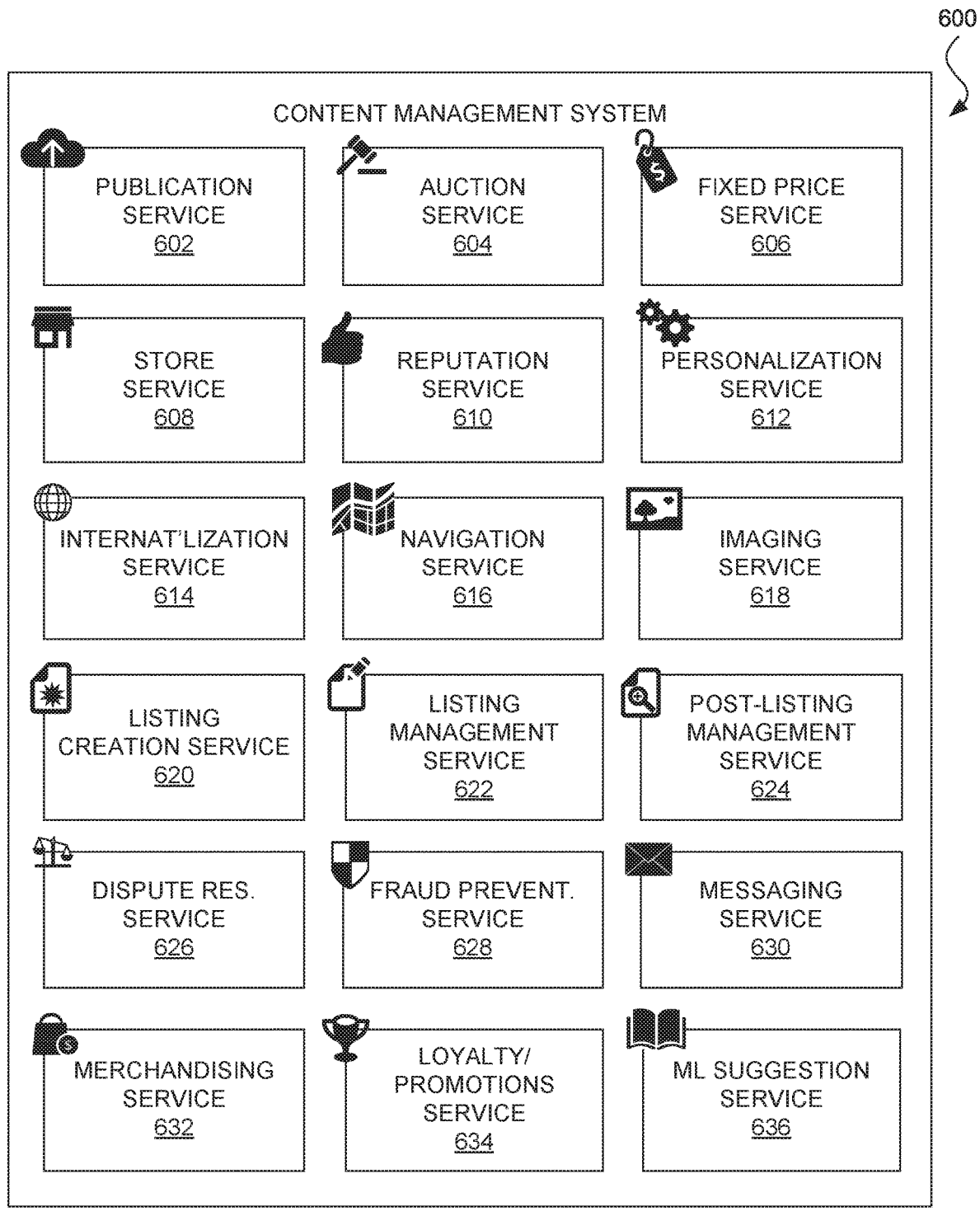
FIG. 6 illustrates services provided by a content management system in accordance with an embodiment.

FIG. 6 shows an example of a collection of services that content management system 600 can deploy in an embodiment of the present disclosure. For illustrative purposes, content management system 600, in this example, can provide certain functionality for users of an online marketplace, such as enabling sellers to add or edit item listings and associated content (e.g., text descriptions of the item listings, photos associated with the item listings, videos associated with the item listings, etc.), allowing buyers to review the item listings (e.g., examine detailed descriptions of item listings, search item listings by keyword or image query, receive recommended item listings, etc.), facilitating the sales or exchange of the item listings (e.g., auctions, fixed price sales, returns, etc.), and the like. Content management system 600 may be physically located on-premises (e.g., hosted within one or more data centers owned or leased by an enterprise), off-premises (e.g., hosted by a public cloud provider, data center provider, etc.), or both (e.g., hosted using a hybrid cloud environment). Thus, the network services can run in dedicated or shared servers that are communicatively coupled to enable communications between the servers. The network services themselves can be communicatively coupled (e.g., via appropriate interfaces) to each other and to various data sources to allow information to be passed between the services or allow the services to share and access common data.

In this example, the network services include publication service 602, auction service 604, fixed-price service 606, store service 608, reputation service 610, personalization service 612, internationalization service 614, navigation service 616, imaging service 618, listing creation service 620, listing management service 622, post-listing management service 624, dispute resolution service 626, fraud prevention service 628, messaging service 630, merchandising service 632, loyalty/promotions service 634, and machine learning suggestion service 636. One of ordinary skill in the art will appreciate that other embodiments may utilize different sets of services, including configurations with more services, fewer services, or alternative services, for providing online marketplace functionality.

Publication service 602 can publish information, such as item listings or production description pages. Auction service 604 can support auction-format listing and other variable price-setting mechanisms (e.g., English, Dutch, Vickrey, Chinese, Double, Reverse auctions etc.). In some embodiments, auction service 604 may also provide a number of features in support of auction-format listings, such as a reserve price feature in which a seller may specify a minimum price that must be exceeded in order for a winning bidder to receive an item in connection with a listing or a proxy-bidding feature in which a buyer may specify a maximum price not to be exceeded by an agent bidding on the buyer's behalf.

Fixed-price service 606 can support fixed-price listing formats (e.g., traditional classified advertisement-type listing or a catalogue listing) and buyout-type listings (e.g., the Buy-It-Now (BIN) technology developed by eBay® Inc.). In some embodiments, buyout-type listings may be offered in conjunction with auction-format listings, and allow a buyer to purchase items (e.g., goods or services), that may also be offered for sale via an auction, for a fixed-price that is typically higher than the starting price of the auction.

Store service 608 can allow a seller to group listings within a "virtual" store, which can include items branded and otherwise personalized by and for the seller. In some embodiments, store service 608 may also provide functionality for sellers to offer promotions, incentives, and features that are specific and customized for the seller.

Reputation service 610 can allow users to establish, build, and maintain reputations in an online marketplace. In some embodiments, reputation service 610 can publish users' reputations to potential trading partners. For example, an online marketplace may support person-to-person trading but users may have no history or other reference information to determine the trustworthiness and credibility of potential trading partners. Reputation service 610 can allow a user to establish a reputation within the online marketplace over time, such as through feedback provided by other transaction partners. Other potential trading partners may then reference such a reputation for the purposes of assessing credibility and trustworthiness.

Personalization service 612 can allow users to customize various aspects of their interactions with an online marketplace. For example, a user may create a personalized reference page on which information regarding transactions to which the user is (or has been) a party may be viewed. Further, personalization service 612 may enable users to customize listings and other aspects of their interactions with the online marketplace and other parties.

In some embodiments, an online marketplace may be organized according to language (e.g., English, Spanish, Mandarin, etc.), geographic region (e.g., Europe, United Kingdom, Scotland, etc.), demographic group (e.g., French Canadians, Basques, Cantonese-speaking Chinese, etc.), or other categorization. For example, one version of the online marketplace may be customized for the United Kingdom, while another version of the online marketplace may be customized for the United States. Each of these versions may operate as an independent marketplace or may be customized (or internationalized) presentations of a common underlying marketplace. Accordingly, the online marketplace may include internationalization service 614 for providing customized information (and/or the presentation of information) by the online marketplace according to predetermined criteria (e.g., lingual, geographic, demographic, or similar criteria).

Navigation of an online marketplace may be facilitated by navigation service 616. In some embodiments, navigation service 616 can include a search service to enable keyword searches of listings published in the online marketplace. In some embodiments, navigation service 616 can also support image searches by receiving an image of an item (e.g., a query image) and providing item listings of items similar to the query. In some embodiments, navigation service 616 can include a browse service that allows users to browse various category, catalogue, or inventory data structures according to which listings may be classified within the online marketplace. Various other navigation services may also be provided to supplement the search and browsing services.

In order to make listings of an online marketplace as visually informative and attractive as possible, content management system 600 may include imaging service 618 to enable users to upload images with listings. In some embodiments, imaging service 618 can also search for images related to a listing and incorporate the related images within the listings. In some embodiments, imaging service 618 may also support one or more promotional features, such as image galleries that are presented to potential buyers. For example, sellers may pay an additional fee to have an image included within a gallery of images for promoted items.

Listing creation service 620 can allow sellers to conveniently author listings pertaining to items (e.g., goods or services) that they wish to transact via an online marketplace. Listing management service 622 can allow sellers to manage such listings. For example, a seller may author and/or publish a large number of listings within the online marketplace. The management of such listings may present the user a challenge. Listing management service 622 can provide a number of features (e.g., auto-relisting, inventory level monitors, etc.) to assist the seller in managing such listings. Post-listing management service 624 can also assist sellers with a number of activities that typically occur after expiration of listings. For example, upon completion of an auction facilitated by auction service 604, a seller may wish to leave feedback regarding a particular buyer. Post-listing management service 624 may provide an interface to reputation service 610 to allow the seller to provide feedback regarding multiple buyers.

Dispute resolution service 626 can provide mechanisms in which disputes arising between transacting parties may be resolved. For example, dispute resolution service 626 may provide guided procedures to direct the parties through a number of steps in an attempt to settle a dispute. In the event that the dispute cannot be settled via the guided procedures, the dispute may be escalated to a third-party mediator or arbitrator.

Fraud prevention service 628 can implement fraud detection and prevention mechanisms to reduce the occurrence of fraud within an online marketplace.

Messaging service 630 can be responsible for the generation and delivery of messages to users of an online marketplace. For example, messaging service 630 can transmit messages regarding the status of listings within the online marketplace (e.g., "outbid" notices to bidders, notifications indicating that a bidder has won an auction, reminders to sellers to ship items, reminders to buyers to pay for items, etc.). Messaging service 630 may utilize any message delivery networks and platforms to deliver messages to users. For example, messaging service 630 may deliver electronic mail (e-mail), instant messages (IMs), Short Message Service (SMS) text messages, facsimiles, or voice messages (e.g., Voice over IP (VoIP)) over various telecommunication networks, such as the Internet, Plain Old Telephone Service (POTS) networks, cellular networks, WIFI networks, etc.).

Merchandising service 632 can support various merchandising functions that are made available to sellers to increase sales in an online marketplace. Merchandising service 632 can also operate the various merchandising features that may be invoked by sellers, and may monitor and track the success of merchandising strategies employed by sellers.

An online marketplace, or one or more parties entering into transactions in the online marketplace, may operate loyalty programs supported by loyalty/promotions service 634. For example, a buyer may earn loyalty or promotion points for each transaction established and/or concluded with a particular seller, and be offered a reward for which accumulated loyalty points can be redeemed.

Machine learning suggestion service 636 can provide the same or similar functionality discussed above with respect to FIG. 1, 2, 3A-3I, 4A, or 4B. That is, a network-based service or application can incorporate machine learning suggestion service 636 to support sellers in creating listings that meet target objectives. As a user creates a listing, content management system 600 can concurrently generate a machine learning model from previous item listings relating to the new listing. Content management system 600 can evaluate user inputs for the new item listing and alternative item listings that substitute attribute values of the new item listing with substitute attribute values. If content management system 600 predicts that the alternative listings may achieve better outcomes, the system can suggest substituting user-entered attribute values with the substitute values.

Figure 7:
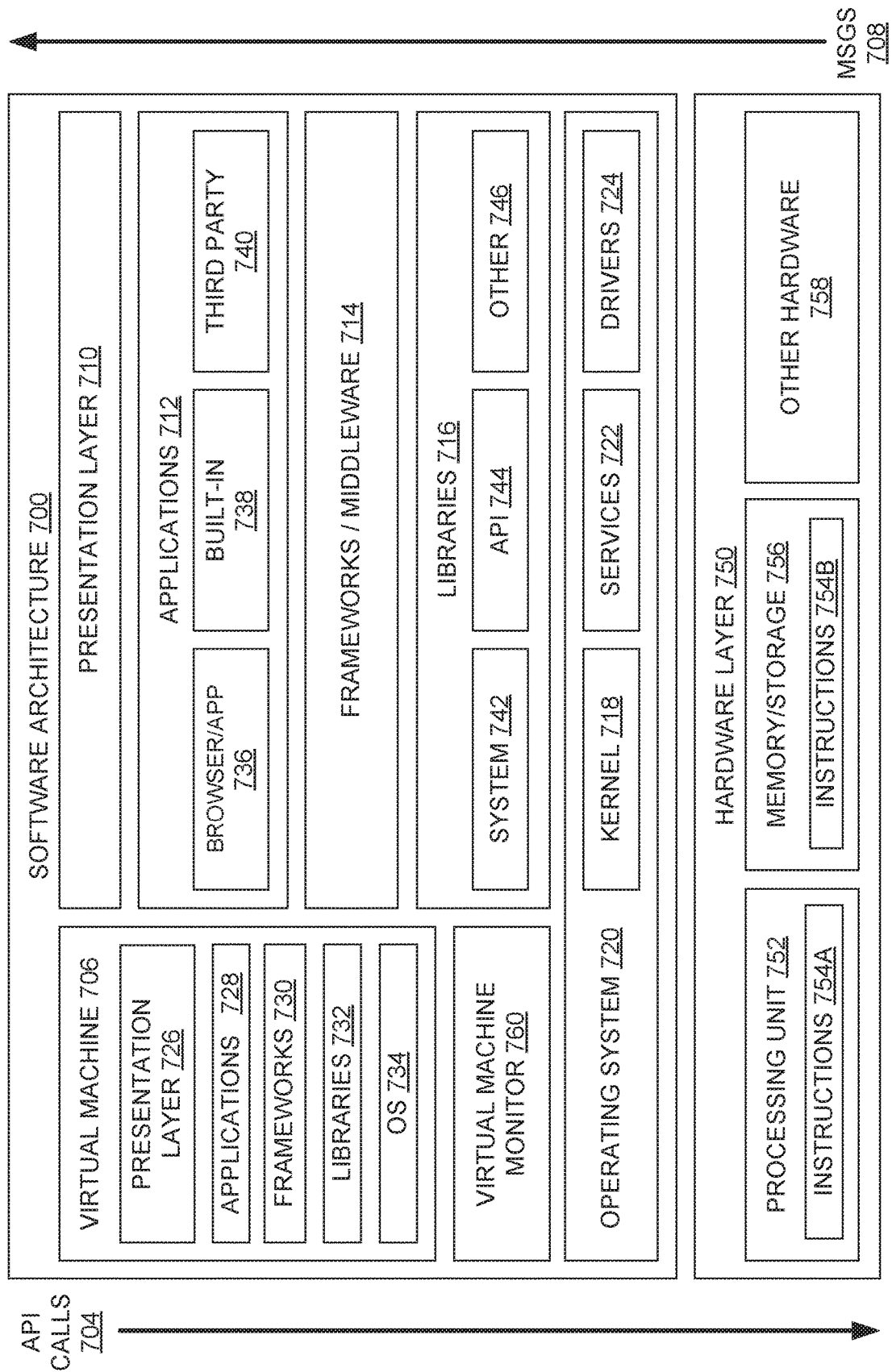
FIG. 7 illustrates an example of a software architecture in accordance with an embodiment.

FIG. 7 shows an example of software architecture 700 that various hardware devices described in the present disclosure can implement. Software architecture 700 is merely one example of a software architecture for implementing various embodiments of the present disclosure and other embodiments may utilize other software architectures to provide the functionality described herein. Software architecture 700 may execute on hardware, such as computing system 800 of FIG. 8. Hardware layer 750 can represent a computing system, such as computing system 800 of FIG. 8. Hardware layer 750 can include one or more processing units 752 having associated executable instructions 754A. Executable instructions 754A can represent the executable instructions of software architecture 700, including implementation of the methods, processes, flows, systems, models, libraries, managers, applications, or components thereof set forth in FIGS. 1A-1C, 2, 3A-3D, 4A-4B, 5, and 6. Hardware layer 750 can also include memory and/or storage modules 756, which also have executable instructions 754B. Hardware layer 750 may also include other hardware 758, which can represent any other hardware, such as the other hardware illustrated as part of computing system 800.

In the example of FIG. 7, software architecture 700 may be conceptualized as a stack of layers in which each layer provides particular functionality. For example, software architecture 700 may include layers such as operating system 720, libraries 716, frameworks/middleware 714, applications 712, and presentation layer 710. Operationally, applications 712 and/or other components within the layers may invoke API calls 704 through the software stack and receive a response, returned values, and so forth as messages 708. The layers illustrated are representative in nature and not all software architectures have all layers. For example, some mobile or special-purpose operating systems may not provide a frameworks/middleware layer 714, while others may provide such a layer. Other software architectures may include additional or different layers.

Operating system 720 may manage hardware resources and provide common services. In this example, operating system 720 includes kernel 718, services 722, and drivers 724. Kernel 718 may operate as an abstraction layer between the hardware and the other software layers. For example, kernel 718 may be responsible for memory management, processor management (e.g., scheduling), component management, networking, security settings, and so on. Services 722 may provide other common services for the other software layers. Drivers 724 may be responsible for controlling or interfacing with the underlying hardware. For instance, drivers 724 may include display drivers, camera drivers, Bluetooth drivers, flash memory drivers, serial communication drivers (e.g., Universal Serial Bus (USB) drivers), Wi-Fi drivers, audio drivers, power management drivers, and so forth depending on the hardware configuration.

Libraries 716 may provide a common infrastructure that may be utilized by applications 712 and/or other components and/or layers. Libraries 716 typically provide functionality that allows other software modules to perform tasks in an easier fashion than to interface directly with the underlying operating system functionality (e.g., kernel 718, services 722, and/or drivers 724). Libraries 716 may include system libraries 742 (e.g., C standard library) that may provide functions such as memory allocation functions, string manipulation functions, mathematic functions, and the like. In addition, libraries 716 may include API libraries 744 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphics for display), database libraries (e.g., SQLite that may provide various relational database functions), web libraries (e.g., WebKit that may provide web browsing functionality), and the like. Libraries 716 may also include a wide variety of other libraries 746 to provide many other APIs to applications 712 and other software components/modules.

Frameworks 714 (sometimes also referred to as middleware) may provide a higher-level common infrastructure that may be utilized by applications 712 and/or other software components/modules. For example, frameworks 714 may provide various graphic user interface (GUI) functions, high-level resource management, high-level location services, and so forth. Frameworks 714 may provide a broad spectrum of other APIs that may be utilized by applications 712 and/or other software components/modules, some of which may be specific to a particular operating system or platform.

Applications 712 can include web browser or native client application 736, built-in application 738, and/or third-party application 740. Some examples of built-in application 738 include a contacts application, a browser application, a book reader application, a location application, a media application, a messaging application, and/or a game application. Third-party application 740 may include any application developed by an entity other than the vendor of the host operating system or platform, such as desktop software running on Microsoft Windows®, UNIX®, LINUX®, Apple Mac OS X®, or other suitable desktop operating system; or mobile software running on a mobile operating system such as Apple iOS®, Google Android®, Microsoft Windows Phone®, or other mobile operating system. In this example, third-party application 740 may invoke API calls 704 provided by operating system 720 to facilitate functionality described herein.

Applications 712 may utilize built-in operating system functions (e.g., kernel 718, services 722, and/or drivers 724), libraries (e.g., system libraries 742, API libraries 744, and other libraries 746), or frameworks/middleware 714 to create user interfaces to interact with users of the system. Alternatively, or in addition, interactions with a user may occur through presentation layer 710. In these systems, the application/module "logic" can be separated from the aspects of the application/module that interact with a user.

Some software architectures utilize virtual machines. In the example of FIG. 7, this is illustrated by virtual machine 706. A virtual machine creates a software environment where applications/modules can execute as if they were executing on a physical computing device (e.g., computing system 800 of FIG. 8). Virtual machine 706 can be hosted by a host operating system (e.g., operating system 720). The host operating system typically has a virtual machine monitor 760, which can manage the operation of virtual machine 706 and the interface with the host operating system (e.g., operating system 720). A software architecture executes within virtual machine 706, and may include operating system 734, libraries 732, frameworks/middleware 730, applications 728, and/or presentation layer 726. These layers executing within virtual machine 706 can operate similarly or differently to corresponding layers previously described.

Figure 8:
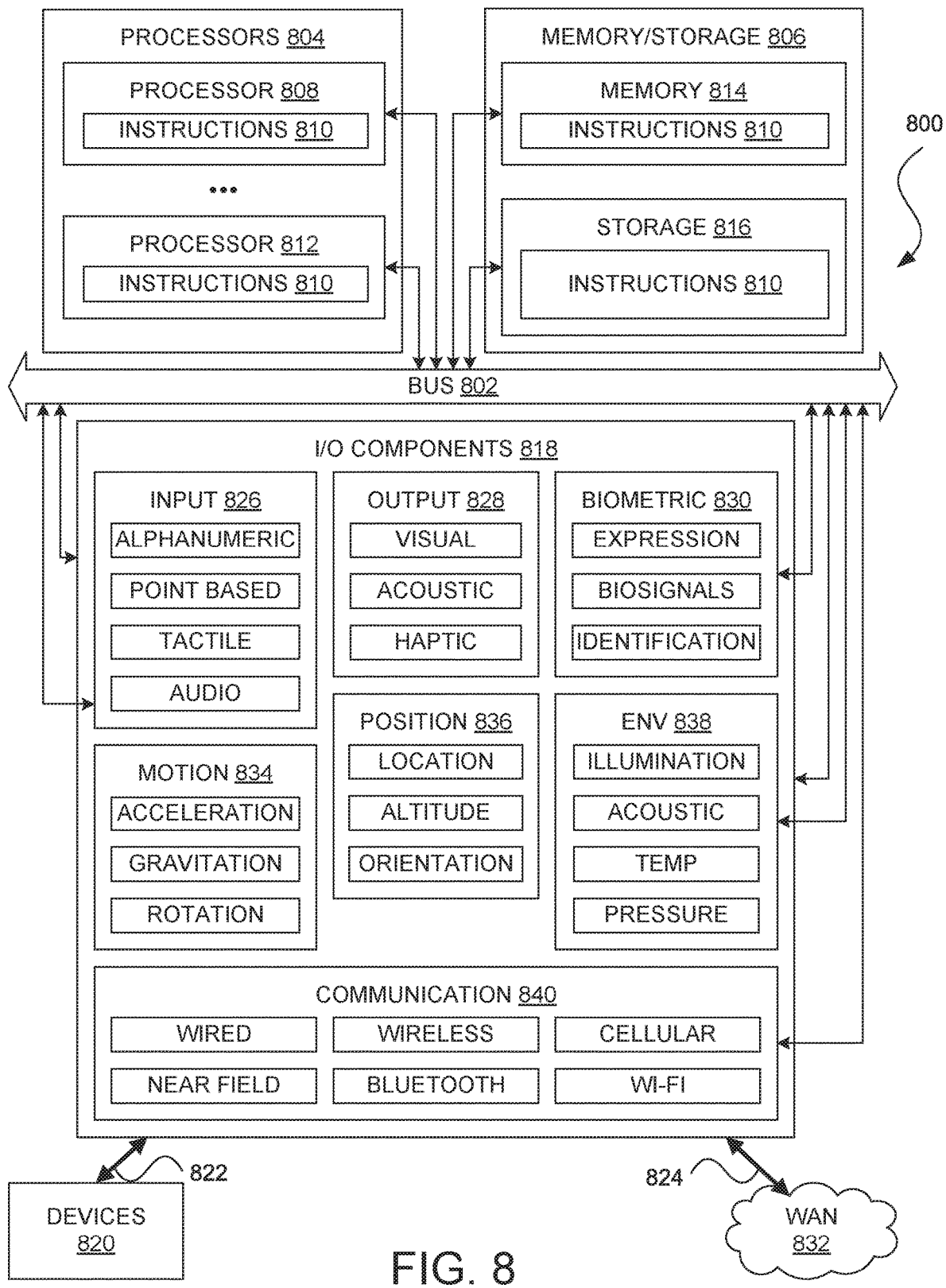
FIG. 8 illustrates an example of a computing device in accordance with an embodiment.

FIG. 8 shows an example of a computing system, computing system 800, in which various embodiments of the present disclosure may be implemented. In this example, computing system 800 can read instructions 810 from a computer-readable medium (e.g., a computer-readable storage medium) and perform any one or more of the methodologies discussed herein. Instructions 810 may include software, a program, an application, an applet, an app, or other executable code for causing computing system 800 to perform any one or more of the methodologies discussed herein. For example, instructions 810 may cause computing system 800 to execute process 400 of FIGS. 4A and 4B. Alternatively or in addition, instructions 810 may implement the methods, processes, flows, systems, models, libraries, managers, applications, or components thereof set forth in FIGS. 1A-1C, 2, and 3A-3D; client applications 512, 514, and 516 or server 520 of FIG. 5; content management system 600 of FIG. 6, software architecture 700 of FIG. 7, and so forth. Instructions 810 can transform a general, non-programmed computer, such as computing system 800 into a particular computer programmed to carry out the functions described herein.

In some embodiments, computing system 800 can operate as a standalone device or may be coupled (e.g., networked) to other devices. In a networked deployment, computing system 800 may operate in the capacity of a server or a client device in a server-client network environment, or as a peer device in a peer-to-peer (or distributed) network environment. Computing system 800 may include a server, a workstation, a desktop computer, a laptop computer, a tablet computer, a netbook, a set-top box (STB), a personal digital assistant (PDA), an entertainment media system, a cellular telephone, a smart phone, a mobile device, a wearable device (e.g., a smart watch), a smart home device, other smart devices, a web appliance, a network router, a network switch, a network bridge, or any electronic device capable of executing instructions 810, sequentially or otherwise, that specify actions to be taken by computing system 800. Further, while a single device is illustrated in this example, the term "device" shall also be taken to include a collection of devices that individually or jointly execute instructions 810 to perform any one or more of the methodologies discussed herein.

Computing system 800 may include processors 804, memory/storage 806, and I/O components 818, which may be configured to communicate with each other such as via bus 802. In some embodiments, processors 804 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio frequency integrated circuit (RFIC), another processor, or any suitable combination thereof) may include processor 808 and processor 812 for executing some or all of instructions 810. The term "processor" is intended to include a multi-core processor that may comprise two or more independent processors (sometimes also referred to as "cores") that may execute instructions contemporaneously. Although FIG. 8 shows multiple processors 804, computing system 800 may include a single processor with a single core, a single processor with multiple cores (e.g., a multi-core processor), multiple processors with a single core, multiple processors with multiples cores, or any combination thereof.

Memory/storage 806 may include memory 814 (e.g., main memory or other memory storage) and storage 816 (e.g., a hard-disk drive (HDD) or solid-state device (SSD) may be accessible to processors 804, such as via bus 802. Storage 816 and memory 814 store instructions 810, which may embody any one or more of the methodologies or functions described herein. Instructions 810 may also reside, completely or partially, within memory 814, within storage 816, within processors 804 (e.g., within the processor's cache memory), or any suitable combination thereof, during execution thereof by computing system 800. Accordingly, memory 814, storage 816, and the memory of processors 804 are examples of computer-readable media.

As used herein, "computer-readable medium" means an object able to store instructions and data temporarily or permanently and may include random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer-readable medium" may include a single medium or multiple media (e.g., a centralized or distributed database, or associated caches and servers) able to store instructions 810. The term "computer-readable medium" can also include any medium, or combination of multiple media, that is capable of storing instructions (e.g., instructions 810) for execution by a computer (e.g., computing system 800), such that the instructions, when executed by one or more processors of the computer (e.g., processors 804), cause the computer to perform any one or more of the methodologies described herein. Accordingly, a "computer-readable medium" can refer to a single storage apparatus or device, "cloud-based" storage systems or storage networks that include multiple storage apparatus or devices, or a system in between these configurations. The term "computer-readable medium" excludes signals per se.

I/O components 818 may include a wide variety of components to receive input, provide output, produce output, transmit information, exchange information, capture measurements, and so on. The specific I/O components included in a particular device will depend on the type of device. For example, portable devices such as mobile phones will likely include a touchscreen or other such input mechanisms, while a headless server will likely not include a touch sensor. In some embodiments, I/O components 818 may include output components 826 and input components 828. Output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. I/O components 818 may include alphanumeric input components (e.g., a keyboard, a touch screen configured to receive alphanumeric input, a photo-optical keyboard, or other alphanumeric input components), pointer-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In some embodiments, I/O components 818 may also include biometric components 830, motion components 834, position components 836, or environmental components 838, or among a wide array of other components. For example, biometric components 830 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. Motion components 834 may include acceleration sensor components (e.g., accelerometer), gravitation sensor components, rotation sensor components (e.g., gyroscope), and so forth. Position components 836 may include location sensor components (e.g., a Global Position System (GPS) receiver component), altitude sensor components (e.g., altimeters or barometers that detect air pressure from which altitude may be derived), orientation sensor components (e.g., magnetometers), and the like. Environmental components 838 may include illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment.

Communication may be implemented using a wide variety of technologies. I/O components 818 may include communication components 840 operable to couple computing system 800 to WAN 832 or devices 820 via coupling 824 and coupling 822 respectively. For example, communication components 840 may include a network interface component or other suitable device to interface with WAN 832. In some embodiments, communication components 840 may include wired communication components, wireless communication components, cellular communication components, Near Field Communication (NFC) components, Bluetooth components (e.g., Bluetooth Low Energy), Wi-Fi components, and other communication components to provide communication via other modalities. Devices 820 may be another computing device or any of a wide variety of peripheral devices (e.g., a peripheral device coupled via USB).

Moreover, communication components 840 may detect identifiers or include components operable to detect identifiers. For example, communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via communication components 840, such as location via Internet Protocol (IP) geolocation, location via Wi-Fi signal triangulation, location via detecting an NFC beacon signal that may indicate a particular location, and so forth.

In various embodiments, one or more portions of WAN 832 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi network, another type of network, or a combination of two or more such networks. For example, WAN 832 or a portion of WAN 832 may include a wireless or cellular network and coupling 824 may be a Code Division Multiple Access (CDMA) connection, a Global System for Mobile communications (GSM) connection, or another type of cellular or wireless coupling. In this example, coupling 824 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

Instructions 810 may be transmitted or received over WAN 832 using a transmission medium via a network interface device (e.g., a network interface component included in communication components 840) and utilizing any one of several well-known transfer protocols (e.g., HTTP). Similarly, instructions 810 may be transmitted or received using a transmission medium via coupling 822 (e.g., a peer-to-peer coupling) to devices 820. The term "transmission medium" includes any intangible medium that is capable of storing, encoding, or carrying instructions 810 for execution by computing system 800, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method, comprising:
   receiving, by a computing system from a client device, a selection of a category for an item listing;
   receiving, by the computing system, a plurality of previous item listings relating to the item listing;
   determining, using one or more processors of the computing system, a target objective for the item listing;
   generating a machine learning model based on the plurality of previous item listings and the target objective, the generating the machine learning model including:
      extracting features and feature values from attributes and attribute values of the plurality of previous item listings;
      generating a plurality of feature vectors corresponding to the plurality of previous item listings from the features and feature values; and
      applying the plurality of feature vectors to a machine learning algorithm of the machine learning model;
   receiving one or more attribute values for one or more attributes of the item listing from the client device, at least a first portion of a first time period of generating the machine learning model coinciding with at least a second portion of a second time period of receiving the one or more attribute values for the item listing from the client device;
   extracting, using image analysis, one or more substitute attributes from items of the plurality of previous item listings;
   performing a first evaluation by applying the one or more attribute values to the machine learning model and one or more second evaluations by applying one or more substitute attribute values associated with the one or more substitute attributes to the machine learning model; and
   in response to determining that a second evaluation represents an improvement upon the first evaluation, presenting a suggestion to substitute an attribute value received from the client device with a substitute attribute value, the suggestion displaying an increased probability of meeting the target objective with the substitute attribute values.

2. The method of claim 1, further comprising:
   loading the plurality of previous item listings into memory prior to generating the machine learning model.

3. The method of claim 1, further comprising:
   receiving distribution data;
   generating a plurality of bins corresponding to the distribution data; and
   distributing the plurality of previous item listings among the plurality of bins in accordance with the distribution data.

4. The method of claim 1, wherein the machine learning algorithm is based on one of Bayesian estimation, minimum mean square error estimation, maximum a posterior estimation, maximum likelihood estimation, sum of squared differences estimation, least squares estimation, or regression.

5. The method of claim 1, further comprising:
   determining a first outcome associated with the first evaluation;
   determining a second outcome associated with the second evaluation; and
   presenting a quantitative difference between the first outcome and the second outcome.

6. The method of claim 1, wherein determining that the second evaluation represents an improvement upon the first evaluation includes:
   determining that a quantitative difference between a first outcome associated with the first evaluation and a second outcome associated with the second evaluation exceeds a minimum quantitative threshold.

7. The method of claim 6, further comprising:
   determining that a confidence level associated with determining the quantitative difference exceeds a minimum confidence threshold.

8. The method of claim 6, further comprising:
   selecting the second evaluation from among a plurality of evaluations based on the quantitative difference between the first outcome and the second outcome representing a maximum quantitative difference between the first outcome and each of the plurality of evaluations.

9. The method of claim 1, wherein the target objective includes maximizing a selling probability, a selling price, or a number of impressions, or minimizing a fee amount or a selling period.

10. The method of claim 1, wherein a user associated with the client device provides a criterion for selection of at least one of the plurality of previous item listings, the target objective, a machine learning algorithm for generating the machine learning model, one or more substitute attributes, one or more substitute attribute values, or a number of second evaluations performed by the computing system.

11. A system, comprising:
one or more processors; and
memory including instructions that, when executed by the one or more processors, cause the system to perform operations comprising:
receiving a selection of a category for an item listing from a client device;
receiving a plurality of previous item listings relating to the item listing;
determining a target objective for the item listing;
generating a machine learning model based on the plurality of previous item listings and the target objective, the generating the machine learning model including:
extracting features and feature values from attributes and attribute values of the plurality of previous item listings:
generating a plurality of feature vectors corresponding to the plurality of previous item listings from the features and feature values; and
applying the plurality of feature vectors to a machine learning algorithm of the machine learning model:
receiving one or more attribute values for one or more attributes of the item listing from the client device, at least a first portion of a first time period of generating the machine learning model coinciding with at least a second portion of a second time period of receiving the one or more attribute values for the item listing from the client device;
extracting using image analysis, one or more substitute attributes from items of the plurality of previous item listings;
performing a first evaluation by applying the one or more attribute values to the machine learning model and one or more second evaluations by applying one or more substitute attribute values associated with the one or more substitute attributes to the machine learning model; and
in response to determining that a second evaluation represents an improvement upon the first evaluation, presenting a suggestion to substitute an attribute value received from the client device with a substitute attribute value, the suggestion displaying an increased probability of meeting the target objective with the substitute attribute values.

12. The system of claim 11, wherein the system presents the suggestion in user real-time.

13. The system of claim 11, wherein the machine learning algorithm is based on one of k-means clustering, hierarchical clustering, density-based clustering, grid-based clustering, or principle component analysis.

14. A non-transitory computer-readable storage medium including instructions that, when executed by one or more processors of a first computing system, cause the first computing system to perform operations comprising:
receiving a selection of a category for an item listing from a client device;
receiving a plurality of previous item listings relating to the item listing;
determining a target objective for the item listing;
generating a machine learning model based on the plurality of previous item listings and the target objective, the generating the machine learning model including:
extracting features and feature values from attributes and attribute values of the plurality of previous item listings;
generating a plurality of feature vectors corresponding to the plurality of previous item listings from the features and feature values; and
applying the plurality of feature vectors to a machine learning algorithm of the machine learning model:
receiving one or more attribute values for one or more attributes of the item listing from the client device, at least a first portion of a first time period of generating the machine learning model coinciding with at least a second portion of a second time period of receiving the one or more attribute values for the item listing from the client device;
extracting, using image analysis, one or more substitute attributes from items of the plurality of previous item listings;
performing a first evaluation by applying the one or more attribute values to the machine learning model and one or more second evaluations by applying one or more substitute attribute values associated with the one or more substitute attributes to the machine learning model; and
in response to determining that a second evaluation represents an improvement upon the first evaluation, presenting a suggestion to substitute an attribute value received from the client device with a substitute attribute value, the suggestion displaying an increased probability of meeting the target objective with the substitute attribute values.

15. The non-transitory computer-readable storage medium of claim 14, wherein at least a portion of a time period of performing the first evaluation occurs within a same time period of at least a portion of a time period of performing the one or more second evaluations.

16. The non-transitory computer-readable storage medium of claim 14, the machine learning algorithm is based on one of k-nearest neighbor, boosting, perceptron, neural network, decision tree, random forest, or support vector machine classification.

* * * * *